United States Patent
Kampman

(10) Patent No.: US 11,544,014 B2
(45) Date of Patent: Jan. 3, 2023

(54) PRINTING SYSTEM AND DEVICE FOR PROCESSING TRANSACTIONS IN A DISTRIBUTED LEDGER

(71) Applicant: Kyocera Document Solutions Inc., Osaka (JP)

(72) Inventor: Eric Louis Kampman, Albany, CA (US)

(73) Assignee: Kyocera Document Solutions Inc., Osaka (JP)

(*) Notice: Subject to any disclaimer, the term of this patent is extended or adjusted under 35 U.S.C. 154(b) by 33 days.

(21) Appl. No.: 17/160,736

(22) Filed: Jan. 28, 2021

(65) Prior Publication Data

US 2022/0244894 A1 Aug. 4, 2022

(51) Int. Cl.

| | |
|---|---|
| G06F 3/12 | (2006.01) |
| G06F 16/23 | (2019.01) |
| G06F 16/27 | (2019.01) |
| G06F 16/22 | (2019.01) |
| G06F 21/60 | (2013.01) |

(52) U.S. Cl.
CPC .......... *G06F 3/1222* (2013.01); *G06F 3/1238* (2013.01); *G06F 3/1288* (2013.01); *G06F 3/1296* (2013.01); *G06F 16/2255* (2019.01); *G06F 16/2379* (2019.01); *G06F 16/27* (2019.01); *G06F 21/608* (2013.01)

(58) Field of Classification Search
None
See application file for complete search history.

(56) References Cited

U.S. PATENT DOCUMENTS

| | | | |
|---|---|---|---|
| 2017/0031676 A1 | 2/2017 | Cecchetti et al. | |
| 2018/0278596 A1 | 9/2018 | Ateniese et al. | |
| 2019/0268162 A1* | 8/2019 | Sahagun | H04L 9/3239 |
| 2021/0303236 A1* | 9/2021 | Park | G06F 21/64 |

FOREIGN PATENT DOCUMENTS

| | | | | |
|---|---|---|---|---|
| EP | 3822894 A1 * | 5/2021 | | G06Q 10/107 |
| WO | 2018/190809 A1 | 10/2018 | | |
| WO | WO-2018190809 A1 * | 10/2018 | | G06Q 20/02 |

* cited by examiner

*Primary Examiner* — Thomas D Lee
(74) *Attorney, Agent, or Firm* — Millen, White, Zelano & Branigan, P.C.; William Nixon

(57) ABSTRACT

A printing system for processing entries in a distributed ledger manages documents or transactions based on printing or scanning operations. A computing platform within the system receives a first entry having a variable set of data. The computing platform determines a partial chain hash of the first entry using the variable set of data. The computing platform generates at least one additional entry having at least one additional variable set of data. The computing platform updates the partial chain hash with the at least one additional variable set of data of the at least one additional entry. The computing platform generates a block having a block header for a blockchain using the partial chain hash when a condition is met. The block includes transactions or documents to be printed at a printing device using the distributed ledger.

20 Claims, 15 Drawing Sheets

PRINTING SYSTEM AND DEVICE FOR PROCESSING TRANSACTIONS IN A DISTRIBUTED LEDGER

FIELD OF THE INVENTION

The present invention relates to a system and device along with associated methods to process entries in a distributed ledger. More particularly, the present invention relates to processing transactions of print jobs in a distributed ledger for a printing system or printing device.

DESCRIPTION OF THE RELATED ART

Printing systems keep expanding in scope. With remote networking and other such features, the management of documents over such networks involves an increasing amount of data as more files are created. The print and scan jobs for the documents also continue to increase such that management may become difficult as well as more security threats in the network. A document management system should track the documents files as well prevent tampering and provide validation for actions taken within the system.

SUMMARY OF THE INVENTION

One aspect of the present disclosure relates to a system configured for processing entries in a distributed ledger. The system may include one or more hardware processors configured by machine-readable instructions. The processor(s) may be configured to receive a first entry having a variable set of data. The processor(s) may be configured to determine a partial chain hash of the first entry using the variable set of data. The processor(s) may be configured to generate at least one additional entry having at least one additional variable set of data. The processor(s) may be configured to update the partial chain hash with the at least one additional variable set of data of the at least one additional entry. The processor(s) may be configured to generate a block having a block header for a blockchain using the partial chain hash when a condition is met.

Another aspect of the present disclosure relates to a method for processing entries in a distributed ledger. The method may include receiving a first entry having a variable set of data. The method may include determining a partial chain hash of the first entry using the variable set of data. The method may include generating at least one additional entry having at least one additional variable set of data. The method may include updating the partial chain hash with the at least one additional variable set of data of the at least one additional entry. The method may include generating a block having a block header for a blockchain using the partial chain hash when a condition is met.

Yet another aspect of the present disclosure relates to a computing platform configured for processing entries in a distributed ledger. The computing platform may include a non-transient computer-readable storage medium having executable instructions embodied thereon. The computing platform may include one or more hardware processors configured to execute the instructions. The processor(s) may execute the instructions to receive a first entry having a variable set of data. The processor(s) may execute the instructions to determine a partial chain hash of the first entry using the variable set of data. The processor(s) may execute the instructions to generate at least one additional entry having at least one additional variable set of data. The processor(s) may execute the instructions to update the partial chain hash with the at least one additional variable set of data of the at least one additional entry. The processor(s) may execute the instructions to generate a block having a block header for a blockchain using the partial chain hash when a condition is met.

Still another aspect of the present disclosure relates to a non-transient computer-readable storage medium having instructions embodied thereon, the instructions being executable by one or more processors to perform a method for processing entries in a distributed ledger. The method may include receiving a first entry having a variable set of data. The method may include determining a partial chain hash of the first entry using the variable set of data. The method may include generating at least one additional entry having at least one additional variable set of data. The method may include updating the partial chain hash with the at least one additional variable set of data of the at least one additional entry. The method may include generating a block having a block header for a blockchain using the partial chain hash when a condition is met.

A method for processing transactions for print jobs in a distributed ledger for a printing system is disclosed. The method includes receiving a first print job having data. The first print job corresponds to a first document. The method also includes determining a partial chain hash of the data for the first print job. The method also includes generating at least one additional print job having data. The at least one additional print job corresponds to at least one additional document. The method also includes updating the partial chain hash with the data of the at least one additional print job. The method also includes generating a block having a block header for a blockchain using the partial chain hash when a condition is met. The method also includes receiving the block at a printing device through the distributed ledger. The method also includes processing the print jobs of the documents corresponding to the block at the printing device.

A method for processing transactions for print jobs in a distributed ledger at a printing device is disclosed. The method includes receiving a first print job having data. The method also includes determining a partial chain hash of the data for the first print job. The method also includes updating the partial chain hash with data of at least one subsequent print job.

The method also includes generating a block having a block header for a blockchain associated with the distributed ledger using the partial chain hash when a condition is met. Each print job is a transaction or document in the block. The method also includes processing the print jobs corresponding to the transactions or documents in the block at the printing device.

A printing system is disclosed. The printing system includes at least one device to generate print jobs. The printing system also includes a printing device to receive the print jobs using a distributed ledger and to process transactions or documents for the print jobs in a block of the distributed ledger. The printing device is configured to receive a first print job of the print jobs. The first print job has data. The printing device also is configured to determine a partial chain hash of the data for the first print job. The printing device also is configured to update the partial chain hash with data of at least one subsequent print job. The printing device also is configured to generate the block having a block header for the distributed ledger using the partial chain hash when a condition is met. Each print job is a transaction or document in the block. The printing device is further configured to process the print jobs corresponding to the transactions or documents in the block at the printing device.

A method for processing entries in a distributed ledger for a printing system is disclosed. The method includes receiving a first entry having data. The first entry relates to a document or a transaction within the printing system. The method also includes determining a partial chain hash of the data of the first entry. The method also includes generating at least one additional entry having data within the printing system. The method also includes updating the partial chain hash with the data of the at least one additional entry. The method also includes generating a block having a block header for a blockchain using the partial chain hash when a condition is met within the printing system.

A method for processing data in a distributed ledger for a printing system is disclosed. The method includes receiving a first entry having data and a second entry having data for the distributed ledger. The first and second entries relate to documents or transactions within the printing system. The method also includes concatenating the data for the first and second entries. The method also includes determining a partial chain hash of the concatenated data. The method also includes updating the partial chain hash with data from subsequent entries related to documents or transactions within the printing system. The method also includes generating a block having a block header for the distributed ledger using the partial chain hash when a condition is met within the printing system.

A method for generating a block within a blockchain for a printing system is disclosed. The method includes determining a first block existing within the blockchain. The method also includes receiving a first entry having data. The method also includes determining a partial chain hash of the data of the first entry. The method also includes generating a second entry having data. The method also includes adding the data of the second entry to the partial chain hash. The method also includes updating the partial chain hash with the data of the second entry. The method also includes repeating the generating, adding, and updating steps for at least one subsequent entry. The method also includes determining the partial chain hash has met a condition. The method also includes generating a second block within the blockchain having a block header and a chain hash based on the partial chain hash.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments protect log-like data within a printing system. The log-like data may relate to documents or transactions within the system. In a log or similar set of incremental entries, it may be important to detect tampering, such as tampering with the print jobs within the printing system. In limited computing resource situations, however, standard one blockchain record per entry may not be feasible. Thus, the disclosed embodiments provide a limited form of blockchain by constraining how many hashes are included in the data set, such as documents or print jobs. This feature may keep tampering detection in place, while sacrificing to some degree at what point that the tampering occurred.

Figure 1A:
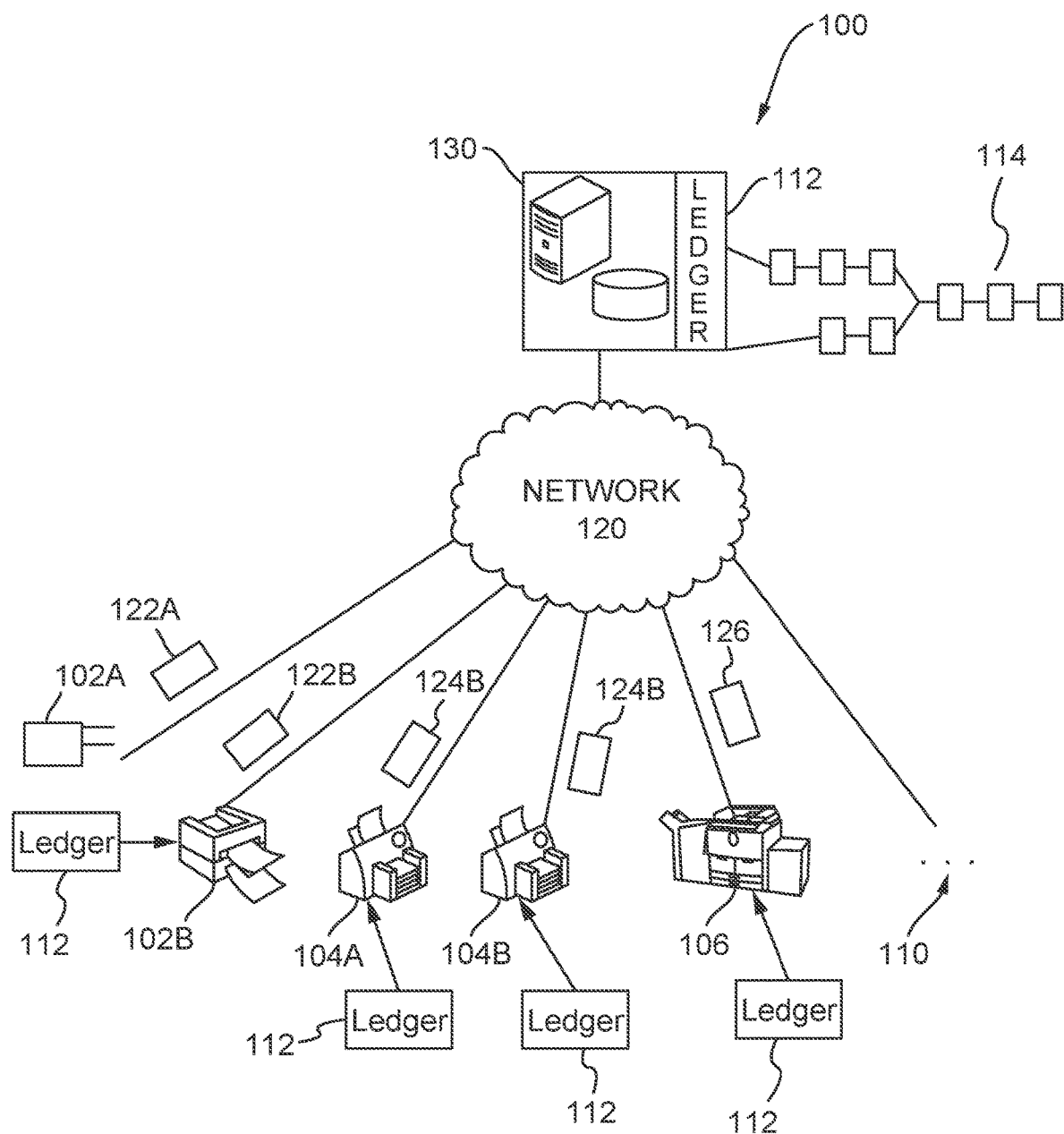
FIG. 1A illustrates a printing system having a distributed ledger according to the disclosed embodiments.

FIG. 1A depicts a block diagram of a printing system 100 of a plurality of printing devices using a distributed ledger 112 according to the disclosed embodiments. Printing system 100 may manage and facilitate the printing or scanning of documents using a printing device. Server 130 may represent any device able to send document to print within system 100 or receive scanned documents within system 100. In some embodiments, server 130 may be referred to as a computing device. Further, more than one server or computing device 130 may be within system 100. For example, several computing devices may print documents within system 100.

System 100 includes printing devices connected to server 130 via network 120. The plurality of printing devices include printing devices 102A, 102B, 104A, 104B, 106, and additional printing devices 110. Printing devices 102A and 102B may be similar device models while printing devices 104A and 104B also may be similar device models that differ from printing devices 102A and 102B. Printing device 106 may be a different model altogether. Additional printing devices may be associated with the different models. Further, system 100 may include additional models of printing devices not shown here for brevity.

Network 120 in system 100 may include one or more wired or wireless connections that support communication between the devices of system 100. In some embodiments, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 is configured to allow communication between server 130 and one or more printing devices within system 100, between the printing devices themselves, or between one or more other devices or systems and system 100. Such communications may include commands, requests, or data corresponding to documents, printing-device errors, or other data.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device.

Each printing device 102A, 102B, 104A, 104B, 106, and 110 may be configured to perform one or more steps, actions, or functions disclosed herein. For example, printing device 102A may communicate with server 130 to transmit or receive data, or information, 122A via network 120. In some embodiments, data 122A is a document to print at printing device 102A. Data 122A represents the image data or electronic version of the document to print. In other embodiments, data 122A may be a scanned document being sent from printing device 102A.

Each printing device may send and receive its own data packages, as shown in FIG. 1. Data may be routed within system 100 using a protocol, such as TCP/IP, in that each device includes its own unique network address. Thus, printing device 102B may transmit or receive data 122B, printing device 104A may transmit or receive data 124A, printing device 104B may transmit or receive data 124B, printing device 106 may transmit or receive data 126, and so on. Further, data 122B may be a document to print at printing device 102B while data 126 is a scanned document being sent from printing device 106.

Server 130 may include a cloud-based server, for example, that can perform one or more tasks to manage or maintain printing devices within system 100. Server 130 may communicate with printing devices 102A, 102B, 104A, 104B, 106, and 110 to transmit and receive data. Server 130 also may manage documents within system 100. System 100 may store documents or document reference data in a blockchain 114 accessible via network 120. The data for the documents may be retrieved by those having access to the documents whether stored on the blockchain or located using a document reference. Documents stored in the blockchain may be printed at a printing device within system 100. The printing devices may be considered blockchain nodes. A document reference may be a unique value that may be used to obtain or access a document. An example data reference may be a uniform resource locator address. Data references also may be a key for a key-value data store or relational database, and the like.

In other embodiments, system 100 may record the transactions of print jobs, copy jobs, send jobs, or scan jobs of documents by the printing devices in blockchain 114. The actions taken within system 100 may be transactions that recorded using a distributed ledger 112, disclosed in greater detail below. System 100 may use blockchain 114 to keep track and manage print jobs as they occur. System 100 also may use the transactions recorded in blockchain 114 to determine costs and record payments within organizations or to users of the printing system.

Blockchain 114 may be a continuously growing list of records, called blocks, which are linked and secured, for example, using cryptography. Each block typically contains a cryptographic hash of the previous block, a timestamp, and transaction data. Blockchain 114 may be resistant to modification of the data within its blocks. Blockchain 114 may be an open, distributed ledger that record transactions, such as documents, print jobs, and scan jobs, in a verifiable and permanent manner. For use as distributed ledger 112, blockchain 114 may be managed by a peer-to-peer network collectively adhering to a protocol for inter-node communications and validating new blocks. Once recorded, the data in any given block may not be altered retroactively without the alteration of all subsequent blocks, which requires the collusion of the majority of the printing device, or nodes, within system 100.

Blockchain 114 may be secure to allow a decentralized consensus to be achieved. This feature makes blockchain techniques useful for printing and scanning operations within system 100, such as the recording of documents, data, transactions such as print and scan jobs, and other records management activities. Printing devices within system 100 may monitor blockchain transaction to identify print jobs, essentially making a printing device a proactive entity look for work. For example, a transaction within a block of blockchain 114 may indicate a print job is created and provide its location within system 100. The blockchain transaction may contain a discrete portion of the print job for immediate testing against the printing device's stored keys. The encryption of a print job may encrypt the documents within the print job, although some print job data may remain unencrypted.

A print job for document may be encrypted with an encryption key. A user may have a private key and a printing device stores a plurality of public keys. Each public key may be associated with account data for a particular user or organization. When a printing device receives a print job, it may attempt to decrypt the print job with every key available thereon. If one of the public keys decrypts the print job then the printing device automatically knows which user submitted the print job. This feature also may be used for data regarding the device creating the document or generating the print job as opposed to user information. For example, a device connected to network 120 may be able to print on a printing device within system 100 and this information is used for the private key. This feature also avoids log ins or verification tasks when conducting printing operations.

System 100 uses distributed ledger 112 for blockchain 114. One or more distributed ledgers 112 may be used to record various transactions or documents within system 100. While a single common ledger 112 is shown in FIG. 1A, some embodiments may include multiple different ledgers used in connection with system 100. For example, different ledgers may be used for different organizations or users of printing system 100. Different ledgers also may be used for different roles, such as printing versus scanning or copying. Ledger 112 may be public, private, permissioned, or secured. In some embodiments, system 100 may be publicly accessible and include printing devices in the public domain, while a subset of entities using the system may maintain one or more private ledgers to which transactions involving the subset of entities are recorded. In other embodiments, all transactions related to system 100, or a particular printing device, may be recorded in ledger 112. Alternatively, some transactions or data associated with transactions may be recorded off-chain.

For example, the creation of an item, such as a document or a print job for a document, may be captured. The data associated with these items may be recorded on ledger 112 or added to blockchain 114. A hash value for the item may be created and written to ledger 112, along with other related data, such as date, time, transaction identifier, related or relevant parties to the item, and the like. The hash value allows anyone to confirm the authenticity of the digital documentation by re-hashing the asset wherever it is stored. If the hash values match, then it can be ensured that not a single bit of data of the digital documentation is altered.

Distributed ledger 112 is an electronic ledger that may be stored and maintained by various components within system 100. Referring to FIG. 1A, distributed ledger 112 may be located on printing devices 102B, 104A, 104B, and 106 as well as server 130. In other embodiments, ledger 112 may only be on server 130 or not on the server at all. It may be maintained by any number of one or more devices within system 100. Further, ledger 112 may comprise an existing or general purpose distributed ledger. Alternatively, ledger 112 may be specific to system 100 or printing operations between printing devices and may be stored and maintained only by devices within system 100.

In the disclosed embodiments, ledger 112 will maintain the same records throughout system 100. For example, ledger 112 on printing device 104A should match ledger 112 on printing device 106. Ledger 112 may verify its data by determining the current state of blockchain 114 to ensure the data results match within ledger locations within system 100. The disclosed embodiments provide protection of data within a ledger or log according to the features set forth below.

Figure 1B:
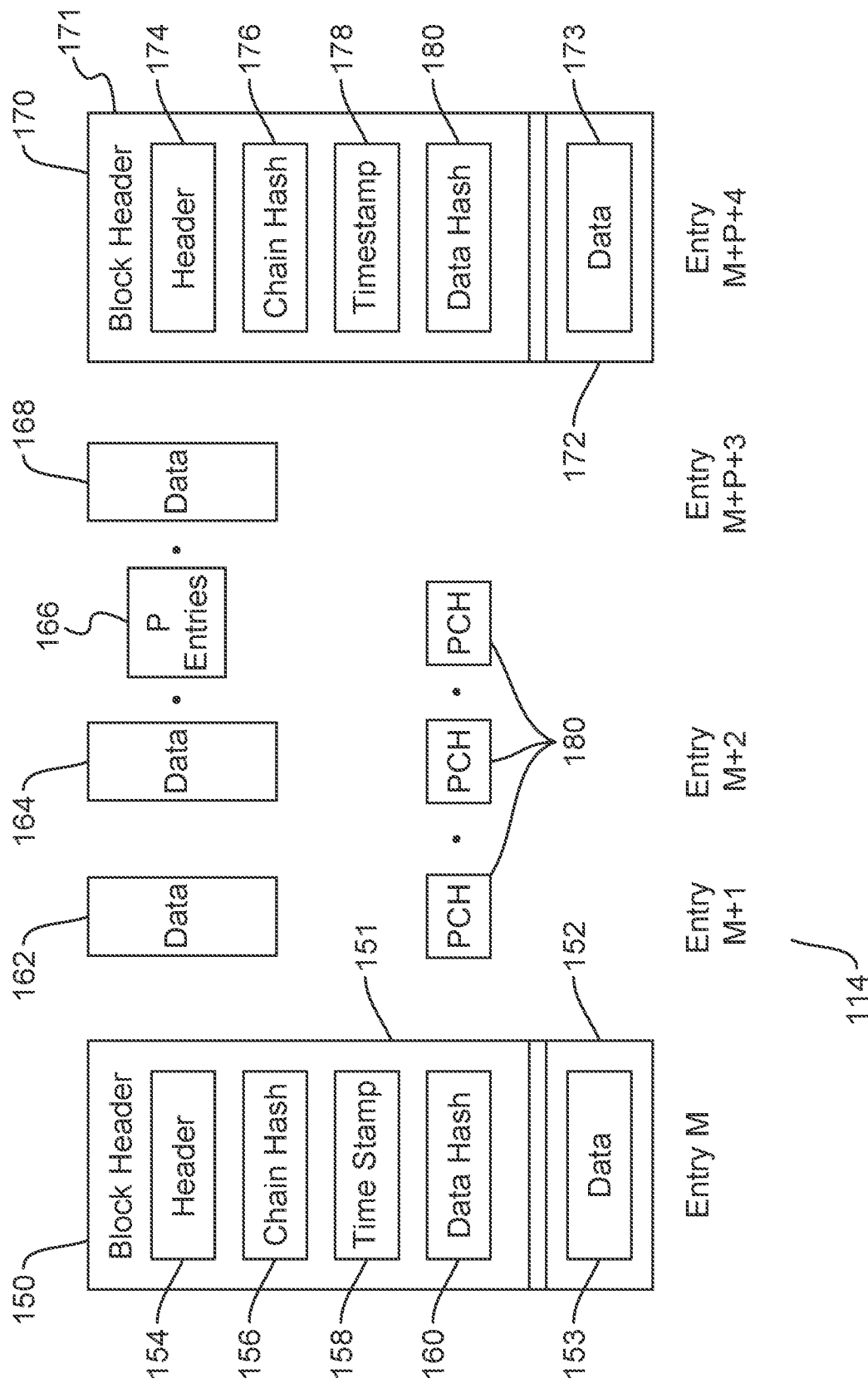
FIG. 1B illustrates blocks and entries in a distributed ledger according to the disclosed embodiments.

FIG. 1B depicts blocks and entries in a distributed ledger 112 according to the disclosed embodiments. The blocks and entries are shown as blockchain 114. It should be noted that ledger 112 and blockchain 114 may refer to the same item but the terms are used interchangeably herein. In some embodiments, ledger 112 may refer to the blockchain distributed within system 100 while blockchain 114 may be used to indicate the blocks and data therein. In a log or similar set of incremental entries, such as those in ledger 112, tampering may be detected. The disclosed embodiments provide a more limited form of blockchain by constraining how many hashes are included in the data set.

As disclosed below, an entry may be a discrete item in the data, such as a document or a print job transaction within system 100. Data may refer to a sequential set of items, such as data 122A to 126 shown above. A block header may be a group of values that define the blockchain. A block may be an entry that contains a blockchain block header. Finalized data may refer to data written to disk as a complete file or sent as a unit over the network.

According to the disclosed embodiments, each chain hash is generated from hashing the previous block's block header and the data of all entries following that block. This feature may obviate the need for creating a block header for every entry in the data. This process, however, does not obviate the need for hashing every entry in the data. It may be anticipated that the hashing can be deferred if entries are being added too quickly within system 100 for the hashing to be done as quickly as needed. At a later point, there will be sufficient processing time or some time-limit threshold will be exceeded such that the hash will be generated nonetheless.

Referring to FIG. 1B, blockchain 114 includes blocks 150 and 170. Block 170 may be created subsequent to block 150 and include data therefrom in accordance with the functions disclosed below. Block 150 includes block header 151. Block header 151 includes a group of values that define block 150. These values may include header 154, chain hash 156, timestamp 158, and data hash 160. These values are disclosed in greater detail below. Block 150 also may include data field 152, which includes data 153 within the block. Data 153 may include documents received within system 100 for printing or from scanning. Data 153 also may be transactions for print or scan jobs performed by devices within system 100. Data 153 may be specific to that block in that it reflects data generated for ledger 112 to reflect these data files generated within system 100 at the time or date provided by timestamp 158.

Block 170 may include the same features as block 150. Block 170 includes block header 171 that includes header 174, chain hash 176, timestamp 178, and data hash 180 that define the block. Block 170 also includes data field 172 with data 173. Preferably, data 173 differs from data 153 in block 150. Block 170, however, includes data that indicates that it was created with data from block 150, in accordance with normal blockchain operations.

FIG. 1B also includes entries 162, 164, 166, and 168, which reflect discrete items of data received at a device hosting ledger 112. In some embodiments, this device may be server 130. Alternatively, it may be a printing device within system 100. Entries 162-168 may be documents generated within system 100 by the various printing devices. They also may be documents generated by a single printing device, such as printing device 102B. In other embodiments, entries 162-168 may be transactions of print or scan jobs performed within system 100, a printing device, or a subset of the printing devices. Data for the entries preferably are generated at the printing devices. Alternatively, the data for the entries may be generated at computing devices connected to system 100 to send print jobs or receive scan jobs over network 120.

Block 150 may be denoted as entry M in ledger 112. Entry 162 may be the next piece of data received as entry M+1. Entry 162 may include data for a document to print or a transaction within system 100. Entry 164 is then received as entry M+2. Entries 166 may represent a number of entries received, with the number being shown as P. If 10 entries are received after entry 164, then P is 10. Entries 166 also include data. Entry 168 is the entry received before the generation of block 170. In the disclosed embodiments, a condition occurs, or is met, that causes the generation of block 170 instead of continuing to receive entries. The condition, for example, may be the total number of entries received that causes a block to be generated. The condition also may be related to the amount of data received. After a specified amount of data is received with the entries, a new block is generated. Thus, a block is not generated every time an entry having data is received but, instead, when a condition is met.

The disclosed embodiments generate chain hash 156 or 176 from hashing the previous block's header and the data of all entries following that block. Chain hash 176, for example, is generated from hashing header 154 and the data of entries 162-168. This feature obviates the need to create a block header for every entry received, or for every document or transaction within system 100. The disclosed embodiments, however, do not obviate the need for hashing every entry in the data. Instead, this hashing may be deferred if entries are being added to quickly for the hashing to be done as quickly as needed. At a later point, there will be sufficient processing time or some threshold, or condition, will be met so that the hash is generated. For example, if the condition is a threshold, then the hashing is performed when a limit will be exceeded upon receipt of an additional entry.

A hash may be defined at a fixed length value that is derived from a variable length set of data. Referring to FIG. 1B, entry 162 may have less amount of data than entries 164 and 168. Entry 164 may have the most amount of data, as shown. Preferably, a secure hashing algorithm (SHA) may be used. A SHA is a cryptographic hash function that takes an input and produces a fixed hash value known as a message digest. It works by transforming the data using the hash function. The hash function may implement an algorithm that includes bitwise operations, modular additions, and compression functions.

The SHA is used to mathematically collapse a variable amount of data into a fixed set of bits, such as 128 bits. Multiple sets of data may be collapsed into the hash to uniquely represent a variable length of data in entries into a fixed number of bits. These also may be known as chained hashes. In some embodiments, SHA-2 may be used as the hash function. SHA-2 hash function may be cumulative in that a separate thread or process can be calculating the partial chain hash of the next block while new entries are being added. In other words, given a typical application programming interface (API) for generating hashes SHA_INIT( ) may indicate to start a new hash,
SHA_UPDATE( ) may indicate to add data to hash, and
SHA_FINALIZE( ) may indicate to generate the hash result, with data-to-hash DATA1 and DATA2. The end results of the following two processes of generating the hash result may be similar Process 1:
SHA_INIT ( )
SHA_UPDATE (DATA1)
SHA_UPDATE (DATA2)
SHA_FINALIZE ( )
Process 2:
SHA_INIT ( )
SHA_UPDATE (DATA1+DATA2), wherein "+" means concatenation
SHA_FINALIZE Thus, it is possible for one thread to be calculating the partial hash of DATA1 while another thread is generating the data of DATA2.

Referring to FIG. 1B, a new hash may start after generation of block 150. Data of entry 162 is hashed using the SHA hash function to generate partial chain hash 180. Meanwhile, the data for entry 164 is being created or received within system 100. Data for entry 164 is then added to partial chain hash 180 while data for entries 166 is being created. Partial chain hash 180 is updated accordingly until a condition is met upon receipt of entry 168. The finalize step above causes the disclosed embodiments to generate the hash result as chain hash 176 when block 170 is generated. The disclosed embodiments, therefore, reduce processing requirements by implementing partial chain hash 180 in adding entries with data to ledger 112.

If chain hash 176 of block 170 is incorrect, then one or more of the entries between block 150 and block 170 may have been tampered with. It may not be possible to say which entry is tampered with. Incidentally, if all entries are blocks, then this becomes a normal blockchain that will allow the disclosed embodiments to identify which entry has been modified. This does not prevent tampering while the data within system 100 is being generated or added to partial chain hash 180. Tamper detection may be possible once the data is incorporated into chain hash 176 of block 170. When the set of data is to become finalized data, if the last entry is not already a block, then a block should be added, most likely with no data. Thus, data field 172 may be included by with no data for data 173.

If one wants to verify that the data between block 150 and block 170 has not been tampered with, then the following process may be implemented:

Process 3

```
SHA_INIT
SHA_UPDATE (Block Header 150)
For each entry from entry M+1 through entry M+P+3 {
    SHA_UPDATE (ENTRY)
}
SHA_FINALIZE ( )
```

The hash value generated should be equal to the value of chain hash 176 in block 170. If it is not, the some of the data in the entries M+1 through M+P+3 have been modified. Because the partial block chain is a concatenation of blocks that can contain intervening entries, by using Process 3, the disclosed embodiments may iterate through the entire blockchain to determine data integrity. If the beginning of the partial block chain is not a block, then the hashing begins at the first entry.

Thus, the disclosed embodiments save on computation requirements in implementing a distributed ledger within system 100. Parallel processing also is allowed. The partial chain hash provides the ability to receive entries of data during operations within system 100 without the need to generate a block for each entry. This feature may be desirable when processing a large number of print jobs, scan jobs, documents, and data from a variety of sources, such as a number of printing devices in different locations. The disclosed embodiments may have fewer block headers in ledger 112 than entries in blockchain 114. Hashes are generated only for blocks, which contain block headers.

As noted above, a condition may invoke the generation of a block when enough entries are received. The condition may be a time period, such as once per hour or every 10 minutes. If no entries are received during the time period, then the generated block may not include data. Another condition may be the number of entries received and added to partial chain hash 180. For example, the number may be 10 such that a block is generated after 10 entries are added to the partial chain hash. Another condition may be the cumulative amount of data received or created. For example, if 10 MB of data is received or created within system 100, then a new block is generated using the partial chain hash of the entries with this data. If processing resources are overburdened for ledger 112, then the disclosed embodiments may wait until the processing resources are available to generate a block. Thus, the disclosed embodiments may invoke the partial chain hash processes disclosed above upon meeting an initial condition.

Figure 2:
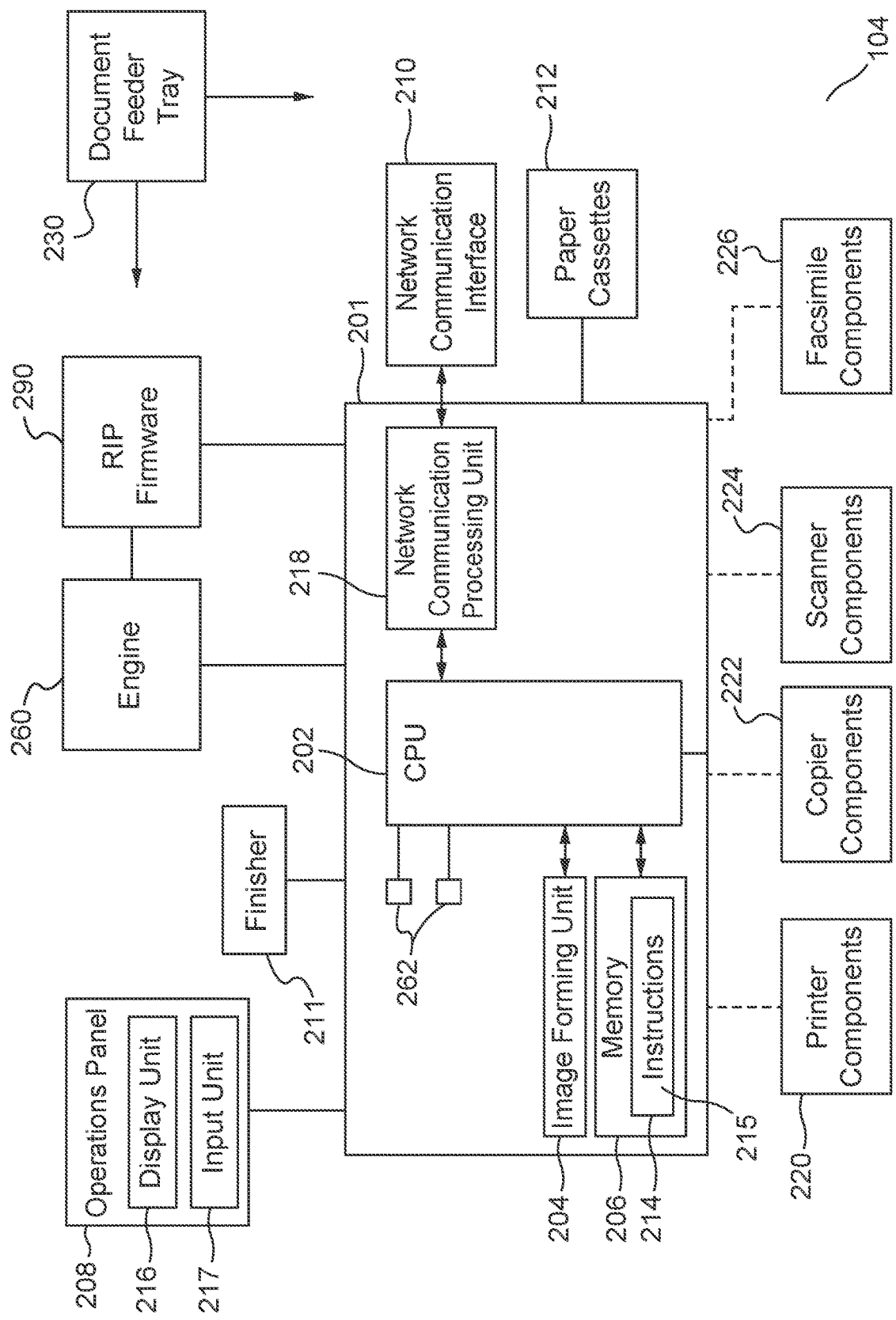
FIG. 2 illustrates a block diagram of the components of a printing device according to the disclosed embodiments.

FIG. 2 illustrates a block diagram of components of a printing device according to the disclosed embodiments. In the disclosure of FIG. 2, printing device 104A may be referred to for illustrative purposes. The architecture shown in FIG. 2 may apply to any multi-functional printing device or image forming apparatus that performs various functions, such as printing, scanning, storing, copying, and the like. As disclosed above, printing device 104A may send and receive data from server 130 and other devices within system 100. Printing device 104A also may include ledger 112.

Printing device 104A includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104A, using computing platform 201, may be configured to perform various operations, such as scanning, copying, printing, receiving or sending a facsimile, or document processing. As such, printing device 104A may be a printing device or a multi-function peripheral including a scanner, and one or more functions of a copier, a facsimile device, and a printer. To provide these functions, printing device 104A includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations. Operation of these components may generate transactions or data to be added to ledger 112 as entries, disclosed above.

Printing device 104A also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104A to receive papers and documents to be processed. A document is placed on or in document processor input feeder tray 230, which moves the document to other components within printing device 104A. The movement of the document from document processor input feeder tray 230 may be controlled by the instructions input by the user. For example, the document may move to a scanner flatbed for scanning operations.

Thus, document processor input feeder tray 230 provides the document to scanner components 220. As shown in FIG. 2, document processor input feeder tray 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104A. For example, a storage location 214 may include data for running an operating system executed by computing platform 201 to support the components within printing device 104A. According to the disclosed embodiments, memory unit 206 may store the tokens and codes used in performing operations for printing device 104A. Memory unit 206 also may store ledger 112 and its associated blocks.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104A to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104A to act as a printer, copier, scanner, and a facsimile device.

Printing device 104A also includes an operations panel 208, which may be connected to computing platform 201. Operations panel 208 may include a display unit 216 and an input unit 217 for facilitating interaction with a user to provide commands to printing device 104A. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104A.

Printing device 104A also includes network communication processing unit 218. Network communication processing unit 218 may establish a network communication using network 120, such as a wireless or wired connection with one or more other image forming apparatuses or analytical server 130. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104A. CPU 202 also may retrieve information stored in memory unit 206, such as settings for printing device 104A.

Printing device 104A also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104A.

Printing device 104A may include one or more sensors 262 that collect data and information to provide to computing platform 201 or CPU 202. Each sensor 262 may be used to monitor certain operating conditions of printing device 104A. Sensors 262 may be used to indicate a location of a paper jam, failure of hardware or software components, broken parts, operating system problems, document missfeed, toner level, as well as other operating conditions. Sensors 262 also may detect the number of pages printed or processed by printing device 104A, or the print volume of the printing device over a period of time or other criteria. When a sensor 262 detects an operational issue or failure event, it may send a signal to CPU 202. CPU 202 may generate an error alert associated with the problem. The error alert may include an error code. Computing platform 201 may transmit the error alert along with the error code to server 130. In some embodiments, the error codes or messages may be stored in a ledger 112 generated according to the disclosed embodiments. The error data is received as entries to ledger 112.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Figure 3:
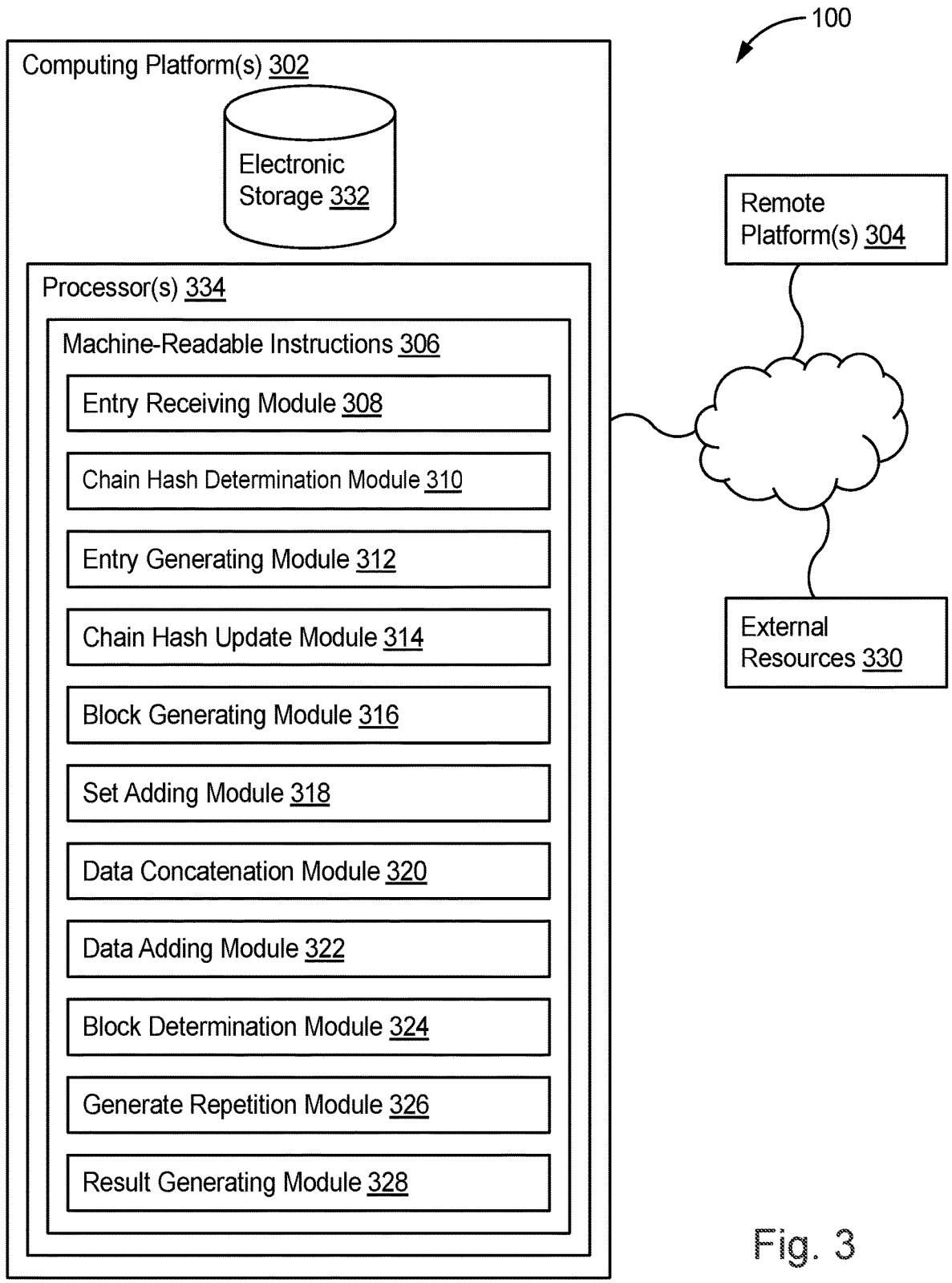
FIG. 3 illustrates a computing platform configured for processing entries in a distributed ledger for a printing system according to the disclosed embodiments.

FIG. 3 illustrates a computing platform 302 configured for processing entries in a distributed ledger 112 in system 100 according to the disclosed embodiments. In some implementations, system 100 may include one or more computing platforms 302. Computing platform(s) 302 may be configured to communicate with one or more remote platforms 304 according to a client/server architecture, a peer-to-peer architecture, or other architectures. Remote platform(s) 304 may be configured to communicate with other remote platforms via computing platform(s) 302 or according to a client/server architecture, a peer-to-peer architecture, or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of entry receiving module 308, chain hash determination module 310, entry generating module 312, chain hash update module 314, block generating module 316, set adding module 318, data concatenation module 320, data adding module 322, block determination module 324, generate repetition module 326, result generating module 328, or other instruction modules.

Entry receiving module 308 may be configured to receive a first entry, or entry 162, having a variable set of data. In other words, the amount of data in the first entry is variable and may be any value. For example, the amount of data may relate to a document of 10 to 100 pages. Entry receiving module 308 may be configured to receive the first entry and at least one additional entry from a device within system 100. Entries 164 to 168 may be representative of the additional entries. The amount of data within the entries may vary, as disclosed above.

Chain hash determination module 310 may be configured to determine a partial chain hash, such as partial chain hash 180, of the first entry having the variable set of data. Chain hash determination module 310 may be configured to determine the partial chain hash from concatenated data for the received entries. The disclosed embodiments may concatenate, or link, the entries together in a chain or series. Chain hash determination module 310 also may be configured to determine that the partial chain hash has met a condition, as disclosed above.

Entry generating module 312 may be configured to generate at least one additional entry for ledger 112 when data is received. For example, entry generating module 312 may be configured to generate a second entry for ledger 112 having data when an action takes place or a new document received. Chain hash update module 314 may be configured to update partial chain hash 180 with the additional entry having a variable amount of data. Chain hash update module 314 may be configured to update partial chain hash 180 with additional entries of data from subsequent items received at ledger 112. For example, chain hash update module 314 may be configured to update partial chain hash 180 with the data of the second entry, or entry 164. The updating may include concatenating the data for the subsequent entries.

Block generating module 316 may be configured to generate a block having a block header for a blockchain using the partial chain hash when a condition is met. Thus, block generating module 316 generates block 170 having block header 171 for blockchain 114. Generation of block 170 may include hashing block header 151 for previous block 150 with partial chain hash 180. Block generating module 316 also may be configured to generate block 170 when a condition is met, such as the number of entries reach a set value. The condition also may refer to reaching a set size of data within the entries. Other conditions are disclosed above.

Set adding module 318 may be configured to add the at least one additional variable amount of data for at least one additional entry to partial chain hash 180. Data concatenation module 320 may be configured to concatenate the first and second data from the first and second entries, respectively. Data adding module 322 may be configured to add the data of the subsequent entries to partial chain hash 180. Block determination module 324 may be configured to determine a first block, such as block 150, existing within blockchain 114. Generate repetition module 326 may be configured to repeat the generating, adding, and updating steps for at least one subsequent entry. Result generating module 328 may be configured to generate a hash result when the condition is met.

In some implementations, computing platform(s) 302, remote platform(s) 304, and/or external resources 330 may be operatively linked via one or more electronic communication links. For example, such electronic communication links may be established, at least in part, via a network such as the Internet or other networks. It will be appreciated that this is not intended to be limiting, and that the scope of this disclosure includes implementations in which computing platform(s) 302, remote platform(s) 304, or external resources 330 may be operatively linked via some other communication media.

A given remote platform 304 may include one or more processors configured to execute computer program modules. The computer program modules may be configured to enable an expert or user associated with the given remote platform 304 to interface with system 300 or external resources 330, and/or provide other functionality attributed herein to remote platform(s) 304. By way of non-limiting example, a given remote platform 304 or a given computing platform 302 may include one or more of a server, a desktop computer, a laptop computer, a handheld computer, a tablet computing platform, a NetBook, a Smartphone, a gaming console, or other computing platforms.

External resources 330 may include sources of information outside of system 300, external entities participating with system 300, or other resources. In some implementations, some or all of the functionality attributed herein to external resources 330 may be provided by resources included in system 300.

Computing platform(s) 302 may include electronic storage 332, one or more processors 334, or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 332 may comprise non-transitory storage media that electronically stores information. The electronic storage media of electronic storage 332 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 332 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 332 may include one or more virtual storage resources (e.g., cloud storage, a virtual private network, or other virtual storage resources). Electronic storage 332 may store software algorithms, information determined by processor(s) 334, information received from computing platform(s) 302, information received from remote platform(s) 304, or other information that enables computing platform(s) 302 to function as described herein.

Processor(s) 334 may be configured to provide information processing capabilities in computing platform(s) 302. As such, processor(s) 334 may include one or more of a digital processor, an analog processor, a digital circuit designed to process information, an analog circuit designed to process information, a state machine, or other mechanisms for electronically processing information. Although processor(s) 334 is shown in FIG. 3 as a single entity, this is for illustrative purposes only. In some implementations, processor(s) 334 may include a plurality of processing units. These processing units may be physically located within the same device, or processor(s) 334 may represent processing functionality of a plurality of devices operating in coordination. Processor(s) 334 may be configured to execute modules 308, 310, 312, 314, 316, 318, 320, 322, 324, 326, or 328, or other modules. Processor(s) 334 may be configured to execute modules 308, 310, 312, 314, 316, 318, 320, 322, 324, 326, or 328, or other modules by software; hardware; firmware; some combination of software, hardware, or firmware; or other mechanisms for configuring processing capabilities on processor(s) 334. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, 326, or 328 are illustrated in FIG. 3 as being implemented within a single processing unit, in implementations in which processor(s) 334 includes multiple processing units, one or more of modules 308, 310, 312, 314, 316, 318, 320, 322, 324, 326, or 328 may be implemented remotely from the other modules. The description of the functionality provided by the different modules 308, 310, 312, 314, 316, 318, 320, 322, 324, 326, or 328 described below is for illustrative purposes, and is not intended to be limiting, as any of modules 308, 310, 312, 314, 316, 318, 320, 322, 324, 326, or 328 may provide more or less functionality than is described. For example, one or more of modules 308, 310, 312, 314, 316, 318, 320, 322, 324, 326, or 328 may be eliminated, and some or all of its functionality may be provided by other ones of modules 308, 310, 312, 314, 316, 318, 320, 322, 324, 326, or 328. As another example, processor(s) 334 may be configured to execute one or more additional modules that may perform some or all of the functionality attributed below to one of modules 308, 310, 312, 314, 316, 318, 320, 322, 324, 326, or 328.

Computing platform 302 may be incorporated or located at server 130 within system 100. Computing platform 302 may monitor entries as they are created or received therein. Alternatively, computing platform 302 may be implemented at one of the printing devices within system 100. For example, printing device 104B may host computing platform 302.

Figure 4A:
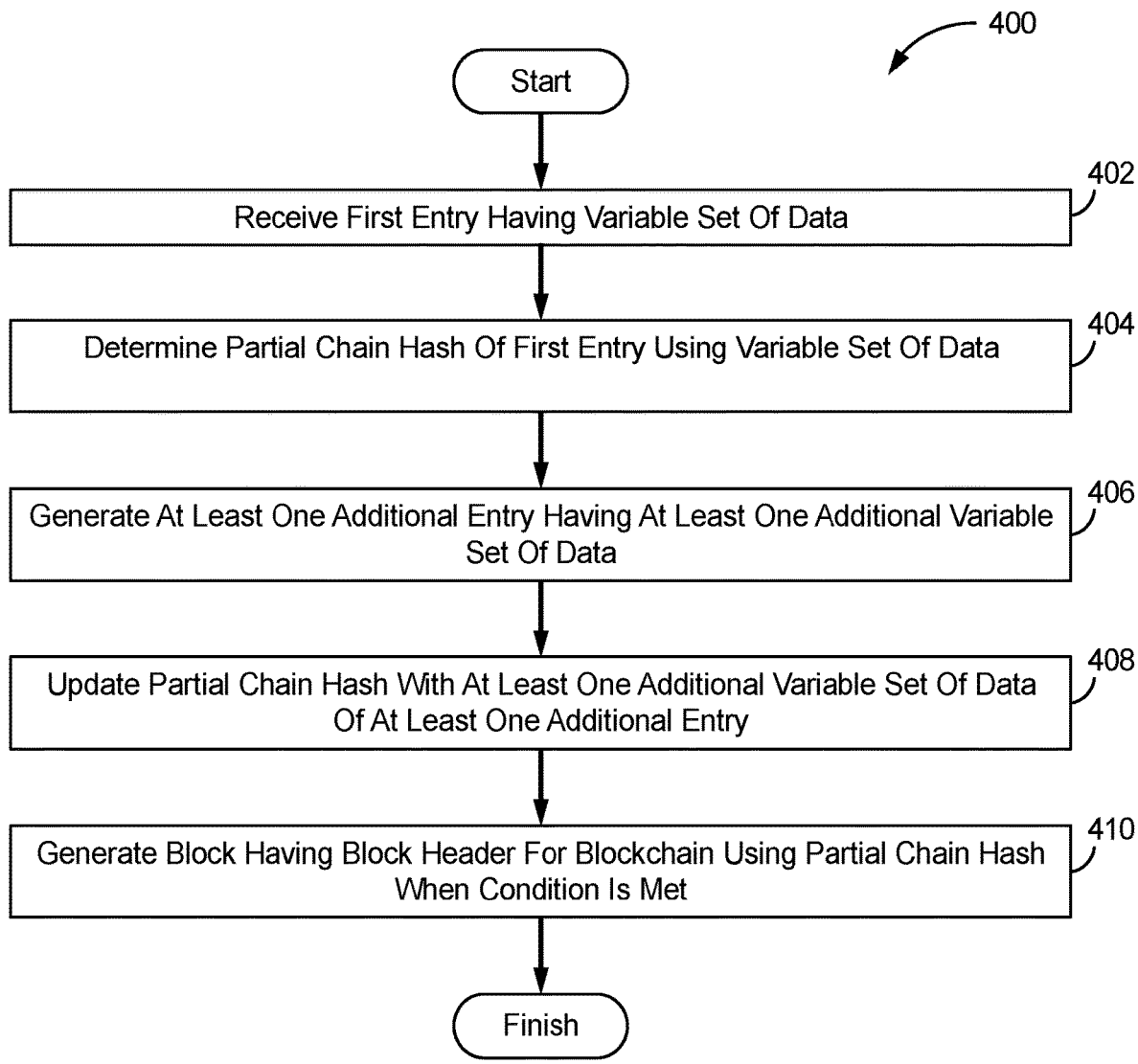
FIG. 4A illustrates a flowchart for processing entries in a distributed ledger for a printing system according to the disclosed embodiments.

FIG. 4A depicts a flowchart 400 for processing entries in a distributed ledger 112 for a printing system 100 according to the disclosed embodiments. Flowchart 400 may refer to features disclosed in FIGS. 1-3 for illustrative purposes. The embodiments of flowchart 400, however, are not limited to the features of FIGS. 1-3. Flowchart 400 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of flowchart 400 in response to instructions stored electronically on an electronic storage medium. The one or more processing devices may include one or more devices configured through hardware, firmware, or software to be specifically designed for execution of one or more of the operations of flowchart 400.

An operation 402 may include receiving a first entry 162 having a variable set of data. Operation 402 may be performed by one or more hardware processors configured by machine-readable instructions including a module that is the same as or similar to entry receiving module 308, in accordance with one or more implementations. An operation 404 may include determining a partial chain hash 180 of the first entry using the variable set of data. Operation 404 may be performed by one or more hardware processors configured by machine-readable instructions including a module that is the same as or similar to chain hash determination module 310, in accordance with one or more implementations.

An operation 406 may include generating at least one additional entry 164 having at least one additional variable set of data. Operation 406 may be performed by one or more hardware processors configured by machine-readable instructions including a module that is the same as or similar to entry generating module 312, in accordance with one or more implementations. An operation 408 may include updating the partial chain hash with the at least one additional variable set of data of the at least one additional entry. Operation 408 may be performed by one or more hardware processors configured by machine-readable instructions including a module that is the same as or similar to chain hash update module 314, in accordance with one or more implementations.

An operation 410 may include generating a block 170 having a block header 171 for a blockchain 114 using the partial chain hash 180 when a condition is met. Operation 410 may be performed by one or more hardware processors configured by machine-readable instructions including a module that is the same as or similar to block generating module 316, in accordance with one or more implementations.

Figure 4B:
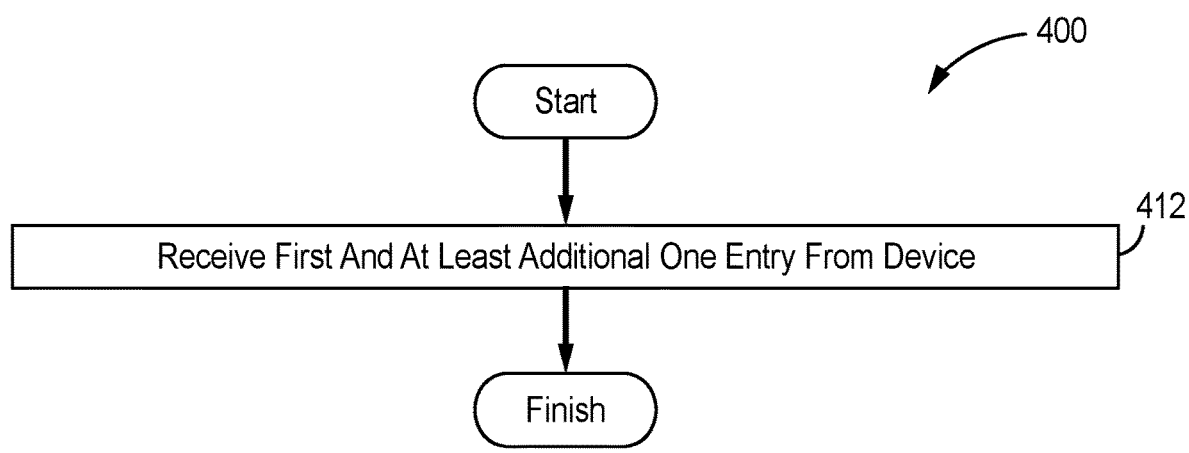
FIG. 4B further illustrates the flowchart of FIG. 4A according to the disclosed embodiments.

FIG. 4B further illustrates flowchart 400 according to the disclosed embodiments. An operation 412 may include receiving the first and the at least one additional entry from a device. Preferably, the entries are created and provided by the printing devices in system 100. A computing device, however, also may create entries to be entered into ledger 112. Server 130 also may be a device to generate entries. Operation 412 may be performed by one or more hardware processors configured by machine-readable instructions including a module that is the same as or similar to entry receiving module 308, in accordance with one or more implementations.

Figure 4C:
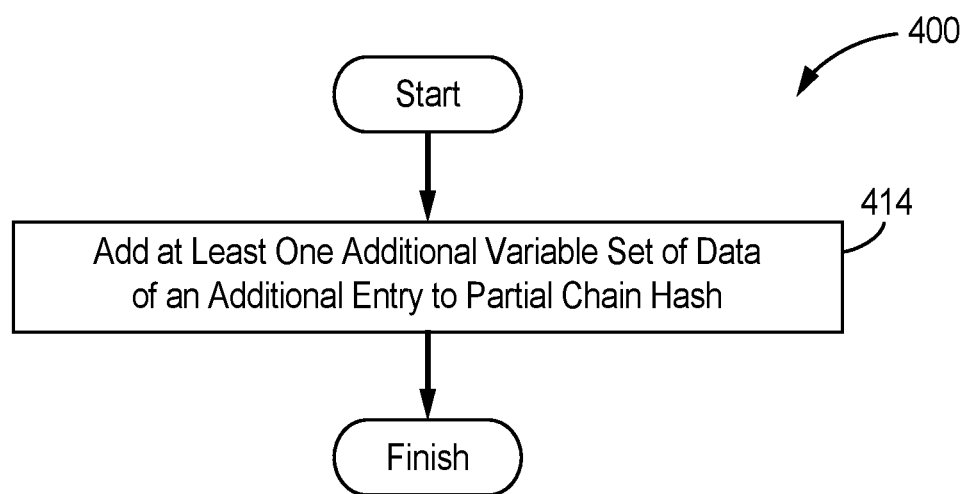
FIG. 4C further illustrates the flowchart of FIG. 4A according to the disclosed embodiments.

FIG. 4C further illustrates flowchart 400 according to the disclosed embodiments. An operation 414 may include adding the at least one additional variable set of data of the at least one additional entry to the partial chain hash. As disclosed in FIG. 1B, data within an entry is added to partial chain hash 180 upon executing the SHA hash function or the data may be added to the data from previous entries before applying the hash. Operation 414 may be performed by one or more hardware processors configured by machine-readable instructions including a module that is the same as or similar to set adding module 318, in accordance with one or more implementations.

Figure 5A:
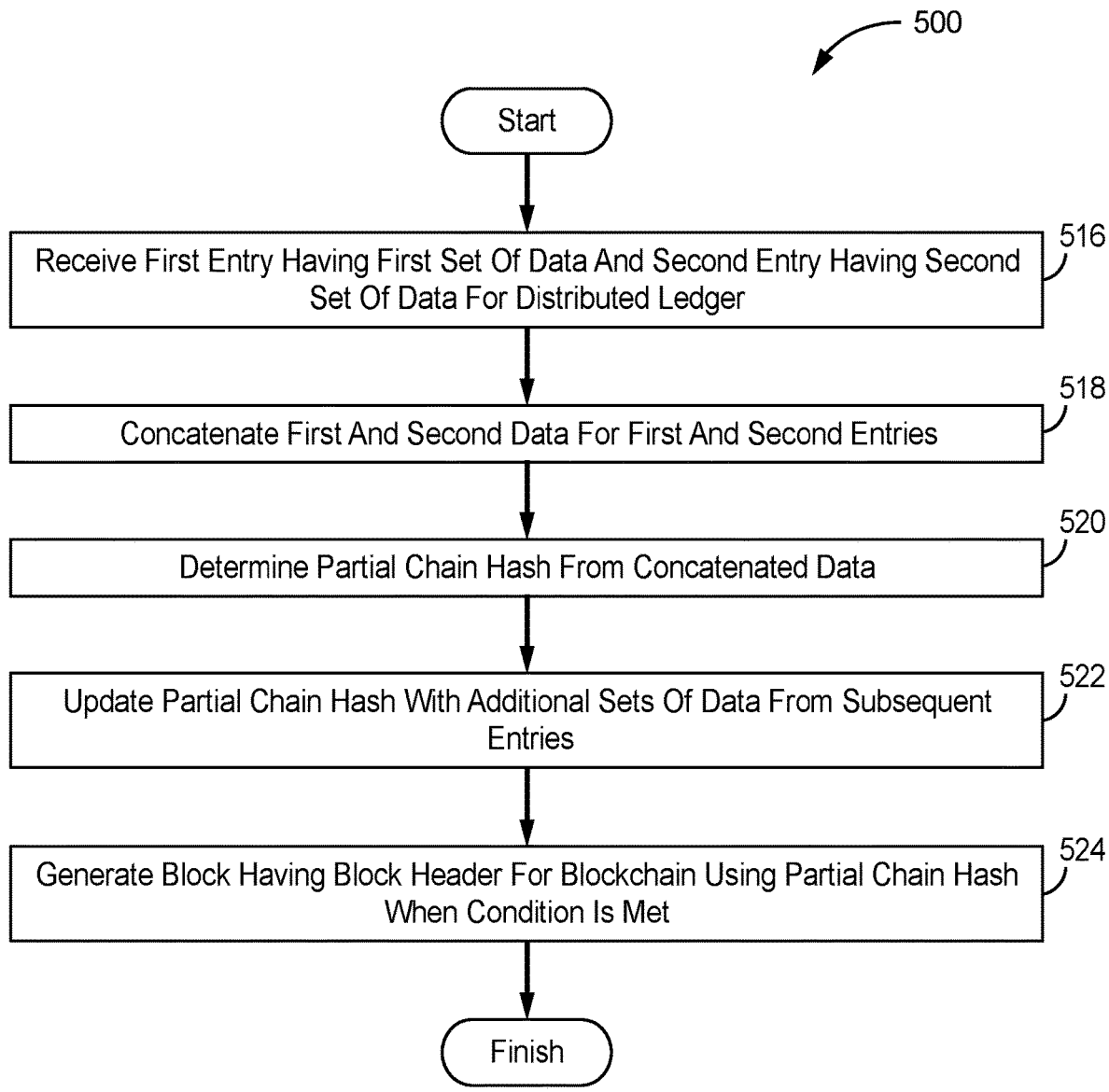
FIG. 5A illustrates a flowchart for processing data in a distributed ledger for a printing system according to the disclosed embodiments.

FIG. 5A depicts a flowchart 500 for processing entries in a distributed ledger 112 for a printing system 100 according to the disclosed embodiments. Flowchart 500 may refer to features disclosed in FIGS. 1-4C for illustrative purposes. The embodiments of flowchart 500, however, are not limited to the features of FIGS. 1-4C. Flowchart 500 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of flowchart 500 in response to instructions stored electronically on an electronic storage medium. The one or more processing devices may include one or more devices configured through hardware, firmware, or software to be specifically designed for execution of one or more of the operations of flowchart 500.

An operation 516 may include receiving a first entry 162 having a first set of data and a second entry 164 having a second set of data for the distributed ledger 112. The first and second sets of data may vary in size. Operation 516 may be performed by one or more hardware processors configured by machine-readable instructions including a module that is the same as or similar to entry receiving module 308, in accordance with one or more implementations.

An operation 518 may include concatenating the first and second data for the first and second entries 162 and 164. Operation 518 may be performed by one or more hardware processors configured by machine-readable instructions including a module that is the same as or similar to data concatenation module 320, in accordance with one or more implementations. An operation 520 may include determining the partial chain hash 180 from the concatenated data. Operation 520 may be performed by one or more hardware processors configured by machine-readable instructions including a module that is the same as or similar to chain hash determination module 310, in accordance with one or more implementations.

An operation 522 may include updating the partial chain hash 180 with additional sets of data from subsequent entries 166. Operation 522 may be performed by one or more hardware processors configured by machine-readable instructions including a module that is the same as or similar to chain hash update module 314, in accordance with one or more implementations. An operation 524 may include generating the block 170 having the block header 171 for the blockchain 114 using the partial chain hash 180 when a condition is met. Operation 524 may be performed by one or more hardware processors configured by machine-readable instructions including a module that is the same as or similar to block generating module 316, in accordance with one or more implementations.

Figure 5B:
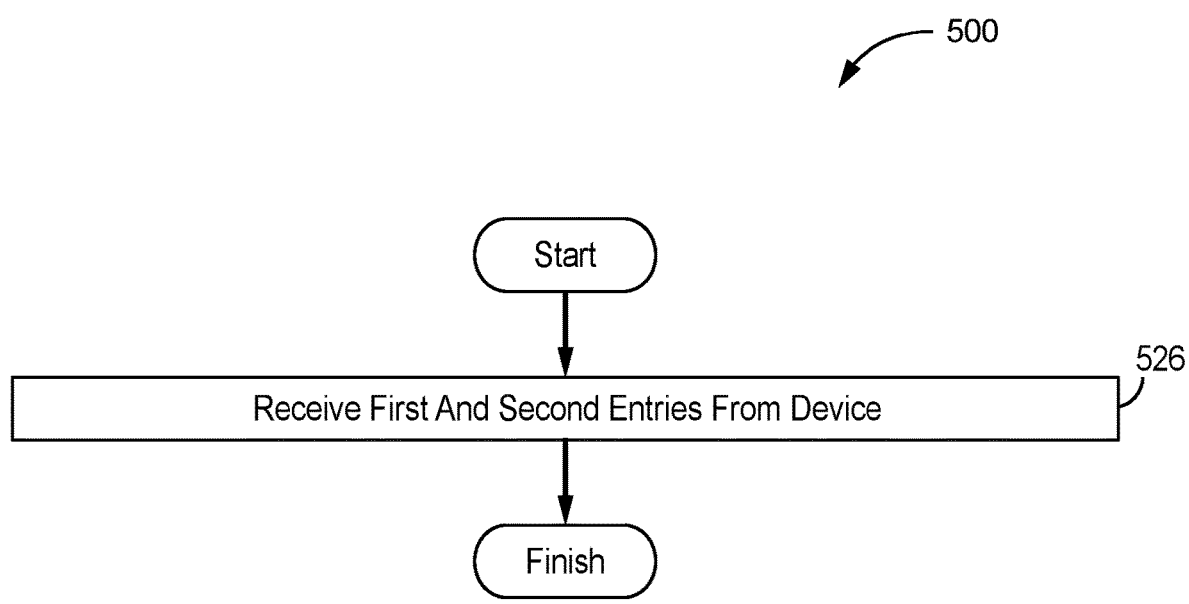
FIG. 5B further illustrates the flowchart of FIG. 5A according to the disclosed embodiments.

FIG. 5B further illustrates flowchart 500 of FIG. 5A according to the disclosed embodiments. An operation 526 may include receiving the first and second entries 162 and 164 from a device. As disclosed above, the device may be a printing device in system 100 or a computing device that sends print jobs within system 100. Alternatively, the device may be a scanning device. The device further may be server 130, which may track documents or print jobs in system 100. Operation 526 may be performed by one or more hardware processors configured by machine-readable instructions including a module that is the same as or similar to entry receiving module 308, in accordance with one or more implementations.

Figure 5C:
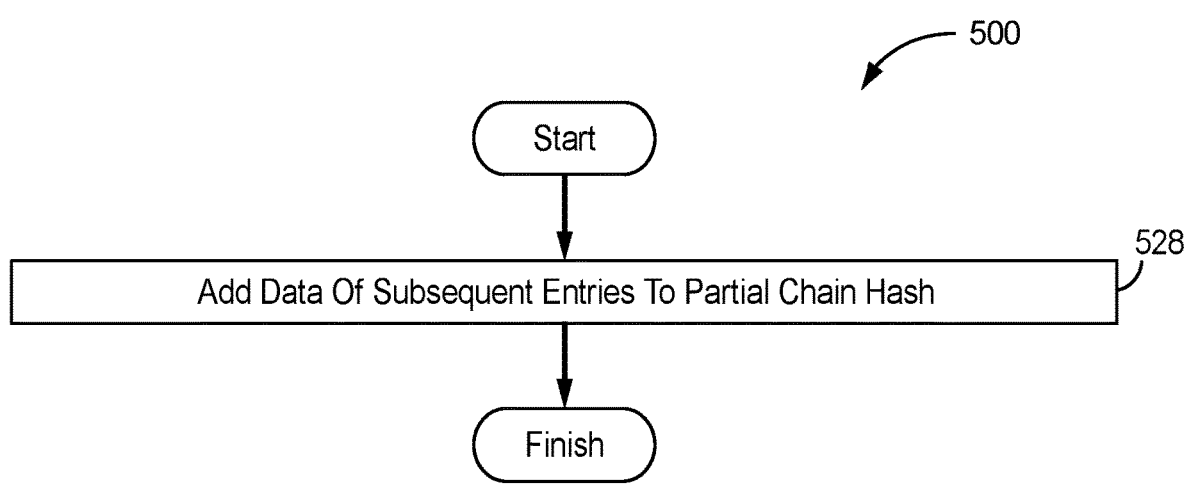
FIG. 5C further illustrates the flowchart of FIG. 5A according to the disclosed embodiments.

FIG. 5C further illustrates flowchart 500 of FIG. 5A according to the disclosed embodiments. An operation 528 may include adding the data of the subsequent entries 166 to the partial chain hash 180. Operation 528 may be performed by one or more hardware processors configured by machine-readable instructions including a module that is the same as or similar to data adding module 322, in accordance with one or more implementations.

Figure 6A:
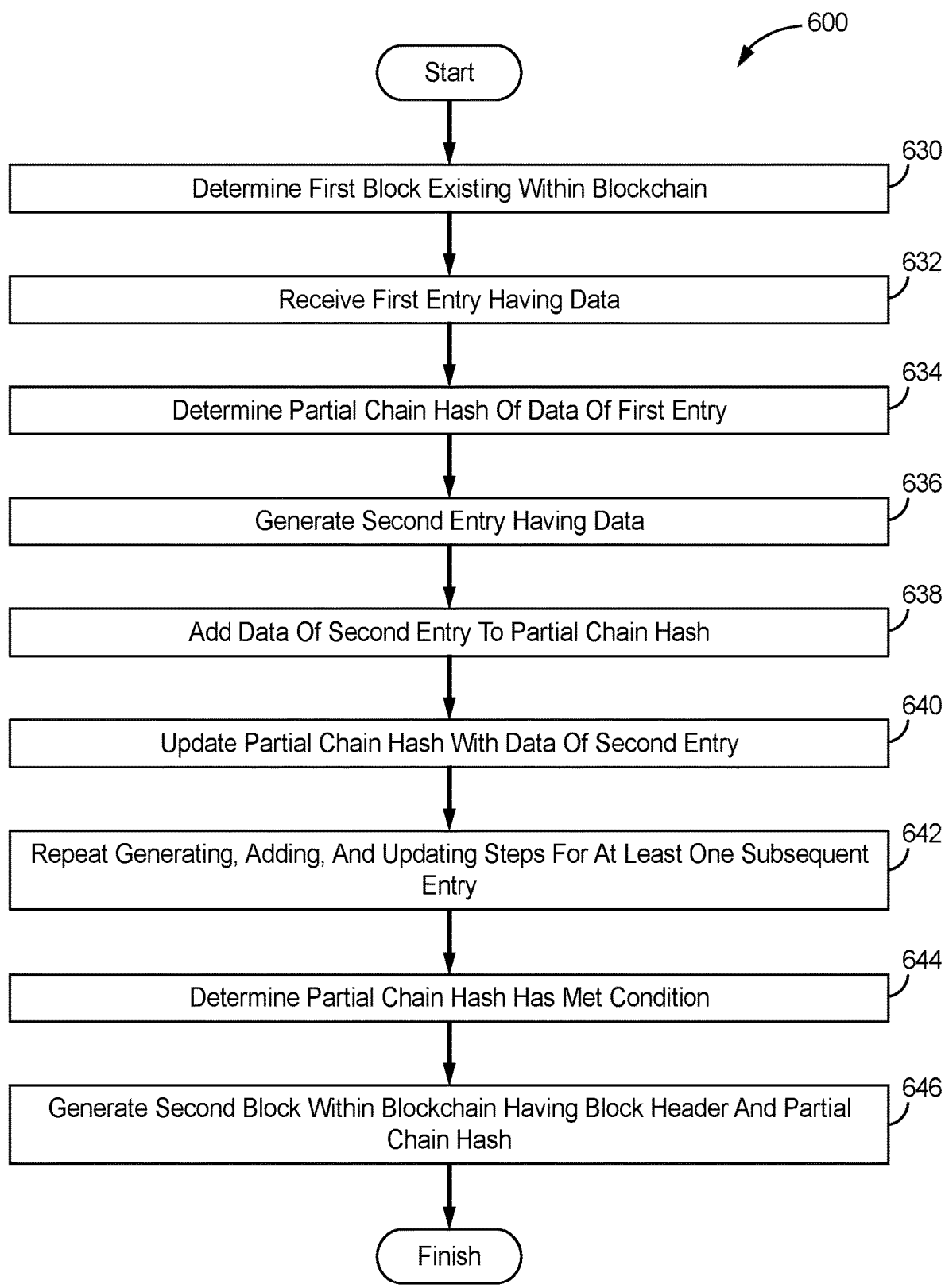
FIG. 6A illustrates a flowchart for generating a block within a blockchain within a printing system according to the disclosed embodiments.

FIG. 6A depicts a flowchart 600 for generating a block 170 for blockchain 114 within printing system 100 according to the disclosed embodiments. Flowchart 600 may refer to features disclosed in FIGS. 1-5C for illustrative purposes. The embodiments of flowchart 600, however, are not limited to the features of FIGS. 1-5C. Flowchart 600 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of flowchart 600 in response to instructions stored electronically on an electronic storage medium. The one or more processing devices may include one or more devices configured through hardware, firmware, or software to be specifically designed for execution of one or more of the operations of flowchart 600.

An operation 630 may include determining a first block 150 existing within the blockchain 114. Operation 630 may be performed by one or more hardware processors configured by machine-readable instructions including a module that is the same as or similar to block determination module 324, in accordance with one or more implementations. An operation 632 may include receiving the first entry 162 having data. Operation 632 may be performed by one or more hardware processors configured by machine-readable instructions including a module that is the same as or similar to entry receiving module 308, in accordance with one or more implementations.

An operation 634 may include determining the partial chain hash 180 of the data of the first entry 162. Operation 634 may be performed by one or more hardware processors configured by machine-readable instructions including a module that is the same as or similar to chain hash determination module 310, in accordance with one or more implementations. An operation 636 may include generating a second entry 164 having data. Operation 636 may be performed by one or more hardware processors configured by machine-readable instructions including a module that is the same as or similar to entry generating module 312, in accordance with one or more implementations.

An operation 638 may include adding the data of the second entry 164 to the partial chain hash 180. Operation 638 may be performed by one or more hardware processors configured by machine-readable instructions including a module that is the same as or similar to data adding module 322, in accordance with one or more implementations. An operation 640 may include updating the partial chain hash 180 with the data of the second entry 164. Operation 640 may be performed by one or more hardware processors configured by machine-readable instructions including a module that is the same as or similar to chain hash update module 314, in accordance with one or more implementations.

An operation 642 may include repeating the generating, adding, and updating steps for at least one subsequent entry 164. Operation 642 may be performed by one or more hardware processors configured by machine-readable instructions including a module that is the same as or similar to generate repetition module 326, in accordance with one or more implementations. An operation 644 may include determining the partial chain hash 180 has met a condition. Operation 644 may be performed by one or more hardware processors configured by machine-readable instructions including a module that is the same as or similar to chain hash determination module 310, in accordance with one or more implementations.

An operation 646 may include generating a second block 170 within the blockchain 114 having a block header 171 and a chain hash 176 based on partial chain hash 180. Operation 646 may be performed by one or more hardware processors configured by machine-readable instructions including a module that is the same as or similar to block generating module 316, in accordance with one or more implementations.

Figure 6B:
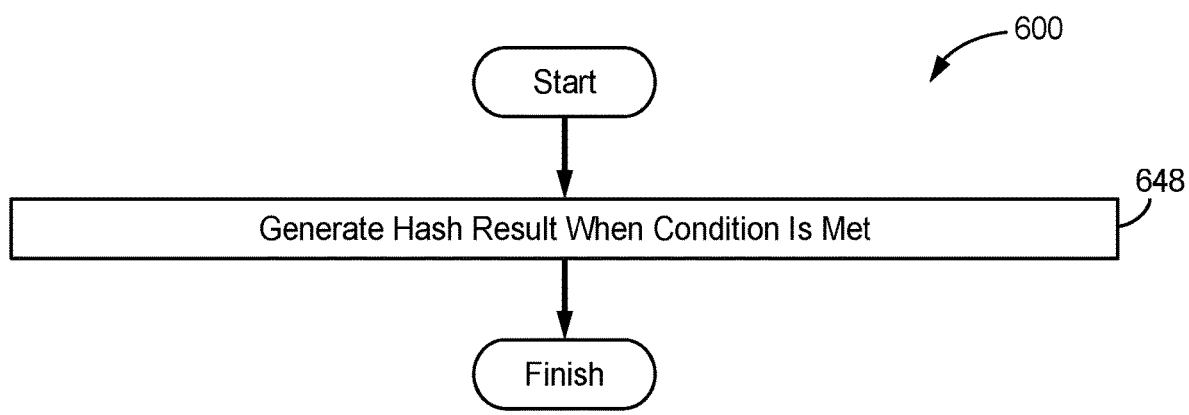
FIG. 6B further illustrates the flowchart of FIG. 6A according to the disclosed embodiments.

FIG. 6B further illustrates flowchart 600 of FIG. 6A according to the disclosed embodiments. An operation 648 may include generating a hash result when the condition is met. Operation 648 may be performed by one or more hardware processors configured by machine-readable instructions including a module that is the same as or similar to result generating module 328, in accordance with one or more implementations.

Figure 7:
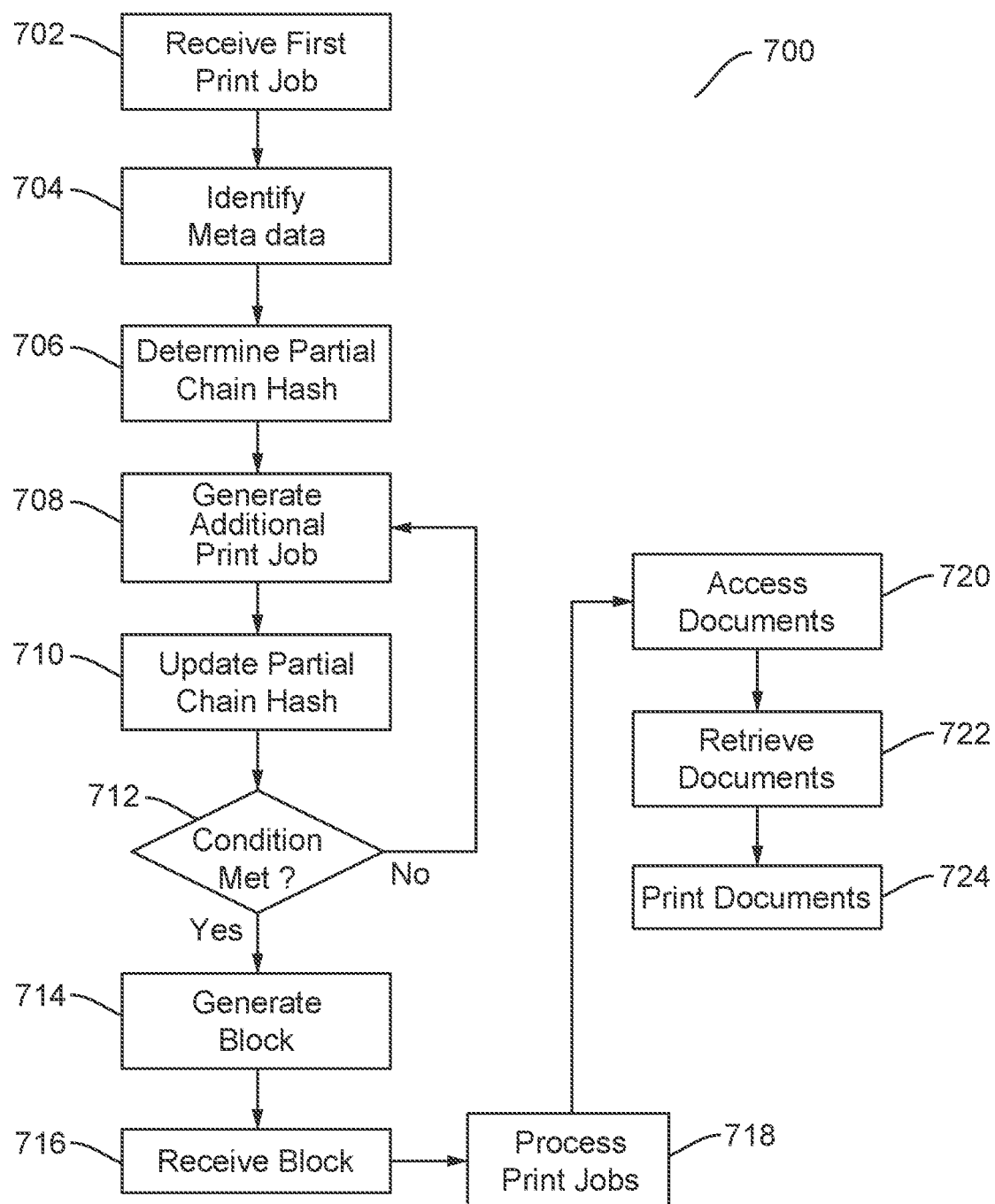
FIG. 7 illustrates a flowchart for processing transactions for print jobs in a distributed ledger in a printing system 100 according to the disclosed embodiments.

FIG. 7 depicts a flowchart 700 for processing transactions for print jobs in distributed ledger 112 in printing system 100 according to the disclosed embodiments. Flowchart 700 may refer to features disclosed in FIGS. 1-6B for illustrative purposes. The embodiments of flowchart 700, however, are not limited to the features of FIGS. 1-6B. Flowchart 700 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of flowchart 700 in response to instructions stored electronically on an electronic storage medium. The one or more processing devices may include one or more devices configured through hardware, firmware, or software to be specifically designed for execution of one or more of the operations of flowchart 700.

An operation 702 may include receiving a first print job having data within printing system 100. Entry 162 may act as the first print job, which corresponds to a document, such as data 122B in system 100. In some embodiments, the data of the first print job may be the document itself, or the data to print the document at a printing device. Alternatively, the data may be transaction data, or metadata, about the document, such as an address, name of document, document number, and the like. Thus, if applicable, an operation 704 may include identifying any metadata associated with the first print job, which becomes the data or part of the data for the print job.

An operation 706 may include determining partial chain hash 180 for the data of the first print job, or entry 162. These processes are disclosed above. The variable amount of data associated with the print job is hashed using, for example, a secure hash algorithm to generate a fixed amount of data for partial chain hash 180. An operation 708 may include generating an additional print job within system 100. Like the first print job, the additional print job will have data. The data may be the document or data about the document. An operation 710 may include updating partial chain hash 180 with the data from the additional print job. In some embodiments, the data may be hashed then added to partial chain hash 180. In other embodiments, the data may be added to partial chain hash 180, then hashed with the SHA.

An operation 712 may include determining whether a condition has been met with regard to partial chain hash 180, ledger 112, or system 100. Examples of applicable conditions are disclosed above. The data associated with the entries received for the partial chain hash may have exceeded a set amount. The number of print jobs may have met a set amount. Other conditions may be implemented, such as the printing device or system generating new blocks at set times or when processing is available.

If operation 712 is no, then flowchart 700 returns to step 708 to continue receiving additional print jobs, or entries, to update partial chain hash 180. If operation 712 is yes, then an operation 714 may include generating block 170 using partial chain hash 180. This process is disclosed in greater detail above. Block 170 is disclosed in greater detail in FIG. 8. Block 170 preferably includes the data for the received print jobs that were used to update partial chain hash 180. Partial chain hash 180 also is used to generate chain hash 176. The received data may be used to generate data hash 180.

An operation 716 may include receiving block 170 at a printing device within system 100. For example, printing device 102B may receive block 170 as it is used to update distributed ledger 112. In other embodiments, block 170 may be received at other printing devices or server 130 as distributed ledger 112 is updated with the newly generated block. An operation may include processing the print jobs corresponding to block 170. Within system 100, it may be detected that a new block is added to ledger 112. The system may assign a printing device to process the print jobs corresponding to the block. In some embodiments, a printing device may notice that block 170 is generated within its ledger 112 such that it processes the print jobs therein. In other words, printing device 104A includes ledger 112 and is responsible for processing any print jobs associated with blocks within the ledger. Alternatively, server 130 may provide these functions and then send the print jobs to the printing devices within system 100.

A document created at a computer may be identified within system 100. Server 130 may host all documents within the system and manage the print jobs for such documents using computing platform 302. According to the disclosed embodiments, a print queue may be shared using distributed ledger 112. For an individual printing device, its print queue may store print job information in a verifiable manner using ledger 112. Print jobs may be submitted to an accessible data storage, such as server 130. Printing devices having access to the data storage may examine print jobs to determine which print jobs that it may print or process using the blocks in ledger 112. Printing devices within system 100 may monitor blockchain transactions to find the print jobs. Further, system 100 may verify the information for the print jobs using ledger 112.

Figure 8:
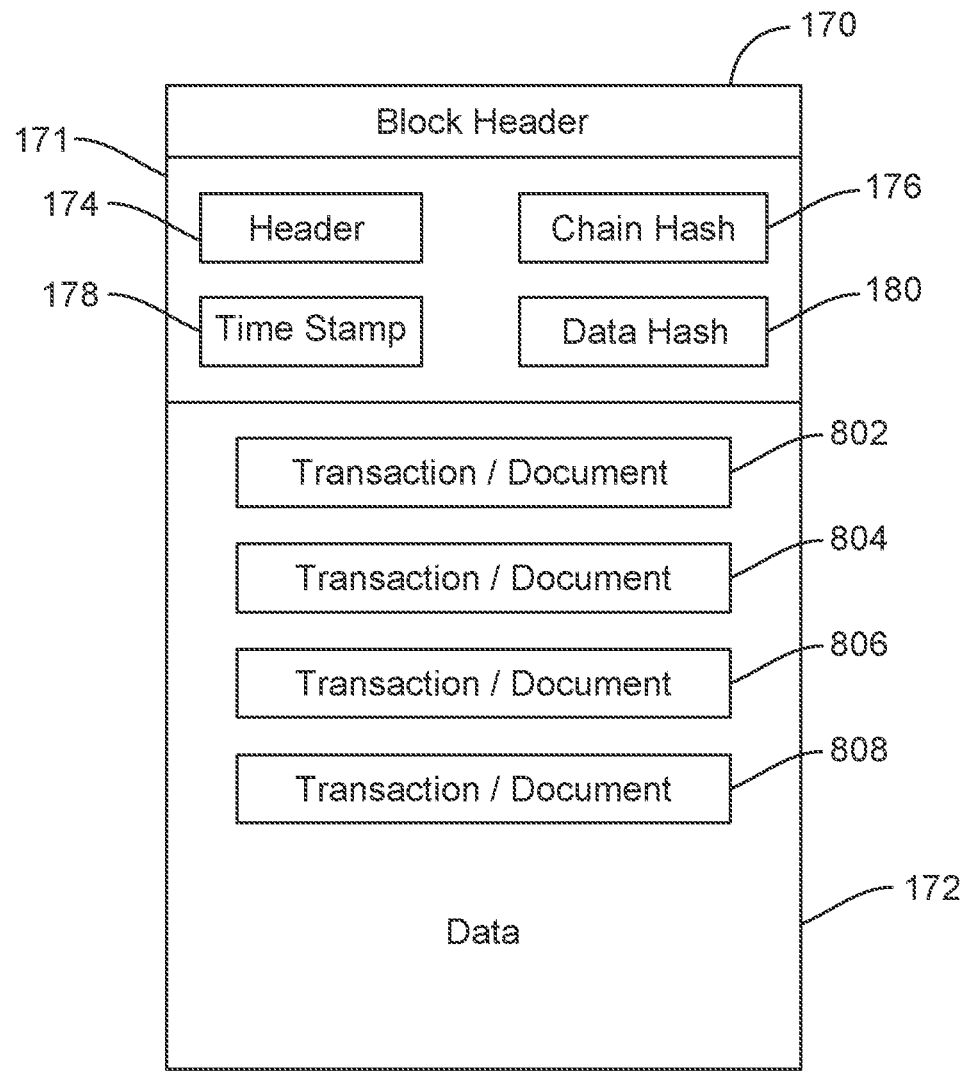
FIG. 8 illustrates a block of the distributed ledger according to the disclosed embodiments.

For example, referring to FIG. 8, block 170 for use within ledger 112 is shown. Block 170 includes block header 171 and data field 172, as disclosed above. Block header 171 includes information that distinguishes block 170 from others in blockchain 114, such as header 174, chain hash 176, timestamp 178, and data hash 180. Data field 172 includes the data associated with block 170. In some embodiments, the data for block 170 includes transaction data for documents being printed in system 100. A transaction may indicate a print job for a document has been created along with associated metadata, such as its location within network 120. The blockchain transaction may include a discrete portion of the print job for immediate verification.

Thus, transaction 802 may refer to a print job within system 100 for a document stored at a device connected to network 120. Transaction 802 may include data that specifically identifies the document, such as document title, storage address, and the like so that a printing device will know where to retrieve the document. Block 170 may include multiple transactions for documents. Thus, transaction 804, transaction 806, and transaction 808 may refer to different print jobs within system 100. It also should be noted that each transaction listed in block 170 corresponds to an entry received by partial chain hash 180, as disclosed above. Thus, block 170 is generated once a condition is met to include all transactions received during the partial chain hash process.

In other embodiments, block 170 may include the document data for the print jobs recorded therein. Thus, instead of transactions, items 802-808 may refer to the file data for the actual documents to be printed. Thus, the printing device does not have to retrieve the documents over network 120. It may simply print out the documents within the block. The print jobs for these documents may be verified using ledger 112. If one of the documents has been modified at a printing device, then ledger should be able to show that there is a discrepancy within blockchain 114. Thus, a printing device within system 100 is configured to obtain data from block 170 within blockchain 114 and render the data contained in the documents.

The disclosed embodiments, using partial chain hash 180 and its processes, may not have to generate a new block for every print job within system 100. In some large print systems, this may reduce processing and storage within ledger 112 by waiting for a condition to occur before generating a block.

An operation 720 may include accessing the documents associated with block 170. As disclosed above, the data within block 170 may include a location to access the documents for the print jobs associated with the received block. An operation 722 may include retrieving the documents for the print jobs of block 170. If the documents are in block 170, then this step may be skipped. An operation 724 may include printing the documents at the printing device. Thus, a group of print jobs may be placed in ledger 112 and processed accordingly by a printing device within system 100 using blockchain 114. Use of the partial chain hash process disclosed above may limit the number of printing operations within system 100 by generating the block with the print jobs when a condition is met.

Figure 9:
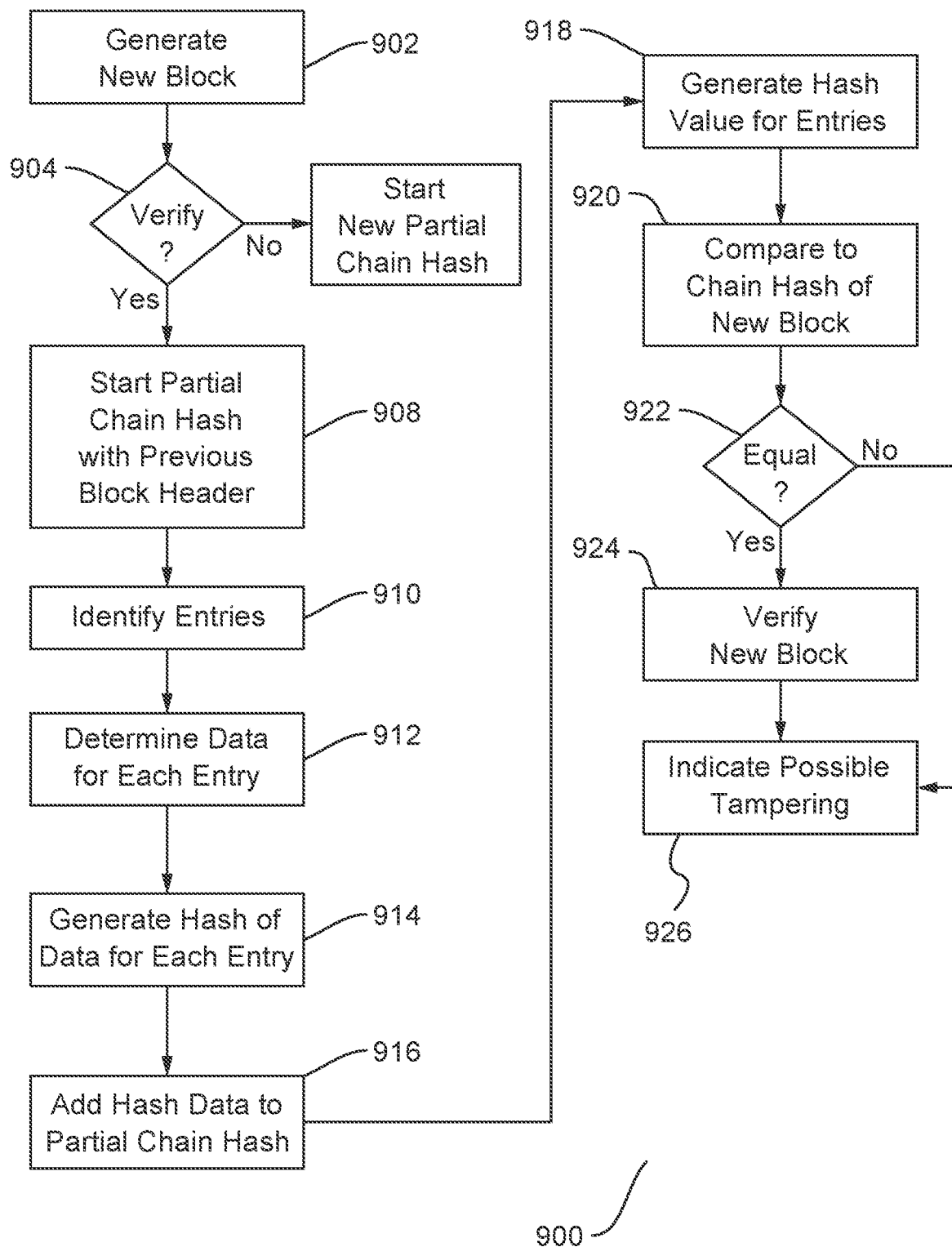
FIG. 9 illustrates a flowchart for verifying a new block in a distributed ledger for a printing system according to the disclosed embodiments.

FIG. 9 depicts a flowchart 900 for verifying a new block in distributed ledger 112 for printing system 100 according to the disclosed embodiments. Flowchart 900 may refer to features disclosed in FIGS. 1-8 for illustrative purposes. The embodiments of flowchart 900, however, are not limited to the features of FIGS. 1-8. Flowchart 900 may be implemented in one or more processing devices (e.g., a digital processor, an analog processor, a digital circuit designed to process information, an analog circuit designed to process information, a state machine, or other mechanisms for electronically processing information). The one or more processing devices may include one or more devices executing some or all of the operations of flowchart 900 in response to instructions stored electronically on an electronic storage medium. The one or more processing devices may include one or more devices configured through hardware, firmware, or software to be specifically designed for execution of one or more of the operations of flowchart 900.

An operation 902 may include generating a new block, such as block 170 shown in FIG. 1B, for distributed ledger 112. New block 170 includes block header 171 having a header 174, chain hash 176, timestamp 178, and data hash 180. As disclosed above, the data within block 170 may refer to print jobs for documents within system 100 or the documents for print jobs in system 100. In other embodiments, the data may refer to documents entered into system 100, such as from scanning devices.

An operation 904 may include determining whether the new block should be verified according to the disclosed embodiments. There may be a difference between the new block values within distributed ledger 112. Some evidence that the data for the new block is incorrect, modified, or tampered with may lead to verification of the new block. If operation 904 is no, then an operation 906 may start a new partial chain hash 180, as disclosed above, for processing entries within system 100. No verification operations are undertaken.

If operation 904 is yes, then an operation 908 may include starting a partial chain hash to verify the block. The partial chain hash may begin with a hash of the previous block's header. For example, block 150 may be the previous block in ledger 112. Block header 151 may be hashed to populate partial chain hash 180. An operation 910 may include identifying entries 162, 164, 166, and 168 that were generated or received after generation of block 150 and beginning of partial chain hash 150. As disclosed above, the entries may be transactions of print jobs performed or to be performed in system 100. The entries also may be the documents to print or generated within system 100. The disclosed embodiments may identify those items received as entries along with the associated data for each.

An operation 912 may include determining data for each entry. As disclosed above, the amount of data within each entry is not the same but may vary between entries. For example, entry 164 may include a greater amount of document for its transaction or document than entry 162. The disclosed embodiments may retrieve the data if the entries are transactions. The different devices within system 100 may be asked to provide the data, if needed.

An operation 914 may include generating a hash of the data for each entry. A SHA function may be applied to the data to convert the data from a variable length to a fixed length of data applicable to partial chain hash 180. In some embodiments, the data is hashed separately. In other embodiments, the data for the entries is concatenated then hashed to generate the hash value for the data. An operation 916 may include adding the hash data from the application of the hash function to partial chain hash 180. Partial chain hash 180 may be populated with the hash value of block header 151 and then incorporates the hash values for the data of the entries.

An operation 918 may include generating a hash value for partial chain hash 180 with the data for the entries. This may be the hash value before the condition was invoked to generate block 170. An operation 920 may include comparing the hash value, or final value of partial chain hash 180, with chain hash 176 of block 170. An operation 922 may include determining whether the final hash value for partial chain hash 180 is equal to chain hash 176.

If operation 922 is yes, then an operation 924 may include verifying that new block 170 is valid. None of the entries used to generate block 170 appear to be tampered with or modified for this block. If operation 922 is no, then an operation 926 may include indicating that possible tampering has occurred as the final value of partial chain hash 180 does not match chain hash 176. Some of the data in the entries has been modified. Because blockchain 114 is a concatenation of blocks that contain intervening entries, the disclosed embodiments may iterate through the entire blockchain to determine data integrity. The disclosed embodiments may not necessarily be able to determine which entry is in error unless a block is generated for each entry then compared to a corresponding block within ledger 112. Tamper detection may be possible once the data has been incorporated into the chain hash of a generated block.

If, during the process of using partial chain hash 180, the disclosed embodiments want to verify entries, then a block may be generated. The condition to generate the block may be an instruction to do so. A last entry may be used to generate block 170, even if the entry has no data. The disclosed embodiments may implement the processes of flowchart 700 to determine if the entries are valid based on the final partial chain hash value during the verification and the chain hash of the generated block.

In a first alternate embodiment, a method for processing entries in a distributed ledger for a printing system includes receiving a first entry having data, wherein the first entry relates to a document or a transaction within the printing system;

determining a partial chain hash of the data of the first entry; generating at least one additional entry having data within the printing system; updating the partial chain hash with the data of the at least one additional entry; and generating a block having a block header for a blockchain using the partial chain hash when a condition is met within the printing system.

The first alternate embodiment also includes receiving the entries from a device.

The first alternate embodiment also includes that the condition includes a number of entries equals a set value.

The first alternate embodiment also includes that the condition includes the partial chain hash reaching a set size of data.

The first alternate embodiment also includes adding the data of the at least one additional entry to the partial chain hash.

The first alternate embodiment also includes that generating the block includes hashing a block header for a previous block with the partial chain hash.

The first alternate embodiment also includes that the device includes a printing device or a scanning device.

The first alternate embodiment also includes that the condition includes that a period of time has elapsed from the receiving step.

In a second alternate embodiment, a method for processing data in a distributed ledger for a printing system includes
receiving a first entry having data and a second entry having data for the distributed ledger, wherein the first and second entries relate to documents or transactions within the printing system;
concatenating the data for the first and second entries;
determining a partial chain hash of the concatenated data;
updating the partial chain hash with data from subsequent entries related to documents or transactions within the printing system; and generating a block having a block header for the distributed ledger using the partial chain hash when a condition is met within the printing system.

The second alternate embodiment also includes receiving the entries from a device.

The second alternate embodiment also includes that the condition includes a number of entries equals a set value.

The second alternate embodiment also includes that the condition includes the partial chain hash reaching a set size of data.

The second alternate embodiment also includes that the condition includes that a period of time has elapsed from the receiving step.

The second alternate embodiment also includes adding the data of the subsequent entries to the partial chain hash.

The second alternate embodiment also includes that the device includes a printing device or a scanning device.

The second alternate embodiment also includes that generating the block includes hashing a block header for a previous block with the partial chain hash.

In a third alternate embodiment, a method for generating a block within a blockchain for a printing system includes
determining a first block existing within the blockchain;
receiving a first entry having data;
determining a partial chain hash of the data of the first entry;
generating a second entry having data;
adding the data of the second entry to the partial chain hash;
updating the partial chain hash with the data of the second entry;
repeating the generating, adding, and updating steps for at least one subsequent entry;
determining the partial chain hash has met a condition; and
generating a second block within the blockchain having a block header and a chain hash based on the partial chain hash.

The third alternate embodiment also includes that receiving the entries includes receiving the entries from at least one device.

The third alternate embodiment also includes generating a hash result when the condition is met.

The third alternate embodiment also includes that the updating includes concatenating the data for the entries.

In a fourth alternate embodiment, a method for verifying entries in a distributed ledger for a printing system includes
generating a new block having a block header with a chain hash;
requesting verification of the new block;
determining a partial chain hash of a block header of a previous block in the ledger;
updating the partial chain hash with data of at least one entry, wherein the data for the at least one entry corresponds to a transaction or a document within the printing system;
generating a hash result after processing data for a last entry of the at least one entry; and
comparing the hash result to the chain hash of the new block to confirm the verification of the new block.

The fourth alternate embodiment also includes identifying the at least one entry provided to the printing system between the previous block and the new block.

The fourth alternate embodiment also includes that the at least one entry includes a plurality of entries used to generate the chain hash for the new block.

The fourth alternate embodiment also includes determining a number for the plurality of entries according to a condition to generate the new block.

The fourth alternate embodiment also includes that the condition corresponds to a set value for the number for the plurality of entries.

The fourth alternate embodiment also includes that the condition corresponds to the partial chain hash reaching a set size of data.

The fourth alternate embodiment also includes generating a new partial chain hash with the block header of the new block.

The fourth alternate embodiment also includes determining that an entry of the at least one entry has been tampered using the partial chain hash compared to the chain hash of the new block.

In a fifth alternate embodiment, a method for verifying transactions or documents for print jobs at a printing device using a blockchain includes
generating a block header of a new block within the blockchain, wherein the block header of the new block includes a chain hash and a timestamp;
determining a partial chain hash of a block header of a previous block within the blockchain;
updating the partial chain hash with the data of at least one print job received at the printing device, wherein the data includes a transaction or a document corresponding to the at least one print job;
generating a hash result after processing data for a last print job of the at least one print job; and
comparing the hash result to the chain hash of the new block to verify the data for the print jobs.

The fifth alternate embodiment also includes determining a new hash value for the partial chain hash using the block header of the new block.

The fifth alternate embodiment also includes that the at least one print job includes a plurality of print jobs each of the plurality of print jobs having data corresponding to a transaction or a document processed at the printing device.

The fifth alternate embodiment also includes identifying the plurality of print jobs according to a condition to generate the new block.

The fifth alternate embodiment also includes that the condition corresponds to a number of print jobs received at the printing device.

The fifth alternate embodiment also includes that the condition corresponds to the partial chain hash reaching a set size of data.

The fifth alternate embodiment also includes determining that a print job of the at least one print job has been tampered using the partial chain hash.

In a sixth alternate embodiment, a printing device includes
an engine to process print jobs;
a processor to instruct the engine to process the print jobs;
a memory to store instructions to configure the processor to verify transactions for the print jobs using a blockchain,
wherein the instructions cause the processor to
generate a block header of a new block within the blockchain, wherein the block header of the new block includes a chain hash and a timestamp;
determine a partial chain hash of a block header of a previous block within the blockchain;
update the partial chain hash with the data of at least one print job received at the printing device, wherein the data includes a transaction or a document corresponding to the at least one print job;
generate a hash result after processing data for a last print job of the at least one print job; and
compare the hash result to the chain hash of the new block to verify the data for the print jobs.

The sixth alternate embodiment also includes an imaging device to generate the print jobs.

The sixth alternate embodiment also includes an input/output port to receive the print jobs over a network.

The sixth alternate embodiment also includes that the processor is further configured to determine that a print job of the at least one print job has been tampered using the partial chain hash.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing device systems coupled to a network capable of exchanging information and data. Various functions and components of the printing device system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for processing transactions for print jobs in a distributed ledger for a printing system, wherein the printing system includes a plurality of devices, the method comprising:
   receiving a first print job having data, wherein the first print job corresponds to a first document;
   receiving a second print job having data, wherein the second print job corresponds to a second document;
   concatenating the data for the first print job with the data for the second print job;
   determining a partial chain hash of the concatenated data for the first print job and the second print job;
   generating at least one additional print job having data, wherein the at least one additional print job corresponds to at least one additional document;
   updating the partial chain hash with the data of the at least one additional print job;
   generating a block having a block header for a blockchain using the partial chain hash when a condition is met;
   receiving the block at a printing device; and
   processing the print jobs of the documents corresponding to the block at the printing device.

2. The method of claim 1, wherein the receiving includes receiving the first print job from a first device of the plurality of devices.

3. The method of claim 2, further comprising receiving the at least one additional print job from a second device of the plurality of devices.

4. The method of claim 1, wherein the data for the print jobs include metadata for each print job.

5. The method of claim 1, wherein the condition includes a number of print jobs that equals a set value.

6. The method of claim 1, wherein the condition includes the partial chain hash reaching a set size of data.

7. The method of claim 1, wherein the condition includes that a period of time has elapsed from the first receiving step.

8. The method of claim 1, wherein generating the block includes hashing a block header for a previous block with the partial chain hash.

9. The method of claim 1, further comprising logging the print jobs as the transactions within the block, wherein the printing device processes the transactions.

10. A method for processing transactions for print jobs in a distributed ledger at a printing device, the method comprising:
    receiving a first print job having data;
    receiving a second print job having data;
    concatenating the data for the first print job with the data for the second print job;
    determining a partial chain hash of the concatenated data for the first print job and the second print job;
    updating the partial chain hash with data of at least one subsequent print job;
    generating a block having a block header for a blockchain associated with the distributed ledger using the partial chain hash when a condition is met, wherein each print job is a transaction or document in the block; and
    processing the print jobs corresponding to the transactions or documents in the block at the printing device.

11. The method of claim 10, further comprising receiving the print jobs from a plurality of devices.

12. The method of claim 10, wherein the condition includes a number of entries equals a set value.

13. The method of claim 10, wherein the condition includes the partial chain hash reaching a set size of data.

14. The method of claim 10, wherein the condition includes that a period of time has elapsed from the receiving step.

15. The method of claim 10, further comprising adding the data of the at least one subsequent print job to the partial chain hash.

16. The method of claim 10, wherein generating the block includes hashing a block header for a previous block with the partial chain hash.

17. The method of claim 10, further comprising storing the block at the printing device and a device on a network including the printing device.

18. A printing system comprising:
    at least one device to generate print jobs; and
    a printing device to receive the print jobs using a distributed ledger and to process transactions or documents for the print jobs in a block of the distributed ledger, the printing device configured to
    receive a first print job of the print jobs, wherein the first print job has data;
    receive a second print job of the print jobs, wherein the second print job has data;
    concatenate the data for the first print job with the data for the second print job;
    determine a partial chain hash of the concatenated data for the first print job and the second print job;
    update the partial chain hash with data of at least one subsequent print job;
    generate the block having a block header for the distributed ledger using the partial chain hash when a condition is met, wherein each print job is a transaction or document in the block; and process the print jobs corresponding to the transactions or documents in the block at the printing device.

19. The printing system of claim 18, wherein the distributed ledger is provided to the at least one device and printing device.

20. The printing system of claim 19, wherein the printing device is configured to verify the block using the distributed ledger.

* * * * *